US011303343B2

(12) United States Patent
You et al.

(10) Patent No.: US 11,303,343 B2
(45) Date of Patent: Apr. 12, 2022

(54) METHOD, TERMINAL DEVICE, AND NETWORK DEVICE FOR BEAM FAILURE MANAGEMENT AND BEAM RECOVERY

(71) Applicant: Huawei Technologies Co., Ltd., Shenzhen (CN)

(72) Inventors: Chunhua You, Shanghai (CN); Xing Liu, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 16/663,740

(22) Filed: Oct. 25, 2019

(65) Prior Publication Data
US 2020/0083946 A1   Mar. 12, 2020

Related U.S. Application Data

(63) Continuation of application No. PCT/CN2018/079893, filed on Mar. 21, 2018.

(30) Foreign Application Priority Data

Apr. 28, 2017  (CN) .......................... 201710295429.1

(51) Int. Cl.
*H04B 7/06* (2006.01)
*H04W 76/19* (2018.01)
(Continued)

(52) U.S. Cl.
CPC ...... *H04B 7/0695* (2013.01); *H04W 28/0278* (2013.01); *H04W 72/0406* (2013.01);
(Continued)

(58) Field of Classification Search
CPC .... H04B 7/0695; H04W 76/19; H04W 76/11; H04W 28/0278; H04W 72/0406;
(Continued)

(56) References Cited

U.S. PATENT DOCUMENTS 10,264,568 B2    4/2019  Zhang et al.
2013/0260745 A1* 10/2013  Johansson ............. H04W 76/19
                                                        455/423
(Continued)

FOREIGN PATENT DOCUMENTS

CN    101198082 A    6/2008
CN    101394213 A    3/2009
(Continued)

OTHER PUBLICATIONS

MediaTek Inc., "RLM and RLF in HF NR", 3GPP TSG-RAN WG2 Meeting #96, R2-168130, Reno, USA, Nov. 14-18, 2016, 5 pages.
(Continued)

*Primary Examiner* — Ian N Moore
*Assistant Examiner* — Latresa A McCallum
(74) *Attorney, Agent, or Firm* — Slater Matsil, LLP

(57) ABSTRACT

This application provides a beam management method, a terminal device, and a network device. The method includes: measuring, by a terminal device, a beam of a network device; and sending, by the terminal device, an identifier of a first beam to the network device, where the first beam is a beam on which a beam failure occurs or a beam meeting a first condition, and the identifier of the first beam is sent to the network device by using physical layer control signaling or by using MAC layer control signaling.

20 Claims, 6 Drawing Sheets

(51) Int. Cl.

| | |
|---|---|
| *H04W 76/11* | (2018.01) |
| *H04W 28/02* | (2009.01) |
| *H04W 72/04* | (2009.01) |
| *H04W 74/00* | (2009.01) |
| *H04W 80/02* | (2009.01) |
| *H04W 74/08* | (2009.01) |

(52) U.S. Cl.
CPC ....... *H04W 72/046* (2013.01); *H04W 74/006* (2013.01); *H04W 76/11* (2018.02); *H04W 76/19* (2018.02); *H04W 80/02* (2013.01); *H04W 74/0833* (2013.01)

(58) Field of Classification Search
CPC . H04W 72/046; H04W 74/006; H04W 80/02; H04W 74/0833; H04W 36/0033; H04W 8/26; H04W 8/20; H04W 36/0072; H04W 16/28; H04L 29/12009
See application file for complete search history.

(56) References Cited

U.S. PATENT DOCUMENTS

| | | | |
|---|---|---|---|
| 2016/0044707 A1* | 2/2016 | Folke | H04W 72/1284 370/329 |
| 2017/0026938 A1 | 1/2017 | Onggosanusi et al. | |
| 2017/0111932 A1* | 4/2017 | Uemura | H04L 5/0055 |
| 2017/0207843 A1* | 7/2017 | Jung | H04B 7/0695 |
| 2017/0273097 A1* | 9/2017 | Guo | H04W 72/121 |
| 2019/0174346 A1* | 6/2019 | Murray | H04W 72/046 |
| 2019/0289476 A1 | 9/2019 | Chen et al. | |
| 2020/0021951 A1 | 1/2020 | Qimei et al. | |

FOREIGN PATENT DOCUMENTS

| | | |
|---|---|---|
| CN | 102137456 A | 7/2011 |
| CN | 102546113 A | 7/2012 |
| CN | 108024268 A | 5/2018 |
| WO | 2016000556 A1 | 1/2016 |
| WO | 2016044994 A1 | 3/2016 |
| WO | 2017024516 A1 | 2/2017 |

OTHER PUBLICATIONS

Xinwei, "Further Discussion on CSI Settings and Beam Management", 3GPP TSG-RAN WG1 NR Ad Hoc, R1-1700779, Spokane, Washington, Jan. 16-20, 2017, 9 pages.

Sony, "Mobility Using Uplink Measurements", 3GPP TSG RAN WG2 Meeting #95, R2-165033, Goteborg, Sweden, Aug. 22-26, 2016, 5 pages.

Huawei, HiSilicon, "General aspects for NR HF cell", 3GPP TSG-RAN2 Ad Hoc on NR, R2-1700167, Spokane, Washington, USA, Jan. 17-19, 2017, 4 pages.

Fujitsu, "Discussion on beam failure recovery procedure", 3GPP Draft; R1-1704478 PDCCH Monitorning for Beam Link Failure Final, vol. RAN WG1, No. Spokane, USA; Apr. 2017, XP051242622.

Samsung, "Discussion on recovery from beam failure", 3GPP Draft; R1-1705343, vol. RAN WG1, No. Spokane, USA; Apr. 2, 2017, XP051243473.

Samsung, "NR beam recovery procedure", 3GPP Draft; R2-1703712 NR Beam Recovery Procedure, vol. RAN WG2, No. Spokane, USA; Apr. 3, 2017, XP051245520.

Huawei et al., "Link recovery procedure for beam failure", 3GPP Draft; R1-1704230, vol. RAN WG1, No. Spokane, USA; Apr. 2017, XP051242382.

Huawei et al., "Remaining issues on beam failure recovery", 3 GPPDRAFT; R1-1801454, vol. RAN WG1, No. Athens, Greece; Feb. 2018, XP051397418.

R1-1701803 ZTE,"Discussion on beam recovery mechanism", 3GPP TSG RAN WG1 Meeting #88, Athens, Greece Feb. 13-17, 2017, 6 pages.

Nokia, Alcatel-Lucent Shanghai Bell, "Radio Link Monitoring and Beam Recovery in NR", 3GPP TSG-RAN WG2 Meeting #97bis, R2-1703554, Apr. 3-7, 2017, 3 pages,Spokane, USA.

\* cited by examiner

METHOD, TERMINAL DEVICE, AND NETWORK DEVICE FOR BEAM FAILURE MANAGEMENT AND BEAM RECOVERY

CROSS-REFERENCE TO RELATED APPLICATIONS

This application is a continuation of International Application No. PCT/CN2018/079893, filed on Mar. 21, 2018, which claims priority to Chinese Patent Application No. 201710295429.1, filed on Apr. 28, 2017. The disclosures of the aforementioned applications are hereby incorporated by reference in their entireties.

TECHNICAL FIELD

This application relates to the field of wireless communications technologies, and in particular, to a beam management method, a terminal device, and a network device in a wireless communications system

BACKGROUND

High frequency may be understood as a relatively high frequency band, for example, a frequency band greater than or equal to 6 GHz. For example, a high-frequency cell may be understood as that a working frequency band of the cell is a frequency band greater than or equal to 6 GHz. When data is transmitted by using a high-frequency technology, a path loss during transmission is usually relatively large. To ensure effective service transmission, a beamforming technology is introduced into the high-frequency cell. In this technology, signal energy is gathered in a required direction to form a beam, for example, to form a beam aligned with a terminal device, so that a demodulation signal-to-noise ratio of the terminal device can be improved, thereby improving cell edge user experience.

Currently, there is no relatively good method for managing a beam sent by a base station to a terminal device.

SUMMARY

This application provides a beam management method, a terminal device, and a network device, so as to manage a beam sent by the network device to the terminal device.

According to a first aspect, this application provides a beam management method, including: measuring, by a terminal device, a beam of a network device; and sending, by the terminal device, an identifier of a first beam to the network device by using physical layer control signaling or media access control MAC layer control signaling, where the first beam is a beam on which a beam failure occurs or a beam meeting a first condition.

In this application, the terminal device measures the beam of the network device, for example, periodically measures the beam of the network device, or measures the beam of the network device according to an indication of the network device. Further, the terminal device sends the identifier of the first beam to the network device, and the first beam is the beam on which the beam failure occurs or the beam meeting the first condition. Optionally, the beam on which the beam failure occurs may be a beam whose reference signal received strength or reference signal received quality is lower than a first threshold. Alternatively, the beam on which the beam failure occurs may be understood as a beam whose reference signal received strength or reference signal received quality is relatively low. Optionally, the beam meeting the first condition may be a beam whose reference signal received strength or reference signal received quality is higher than a second threshold. Alternatively, the beam meeting the first condition may be understood as a beam whose reference signal received strength or reference signal received quality is relatively high. In a possible design, the identifier of the first beam is sent to the network device by using the physical layer control signaling. In another possible design, the identifier of the first beam is sent to the network device by using the MAC layer control signaling. For example, a MAC layer is a media access control control element (MAC CE for short). Because the terminal device may send the identifier of the first beam to the network device after measuring the beam, the network device may further manage the beam, for example, readjust a beam serving the terminal device. In addition, because the identifier of the first beam is sent to the network device by using the physical layer control signaling or the MAC layer control signaling, it can be ensured that a beam with relatively poor quality or a beam with relatively good quality is quickly reported to the network device in time, so as to facilitate beam management.

Optionally, the terminal device sends the identifier of the first beam to the network device only when a specified condition is met. For example, after the terminal device measures a beam and determines that a beam failure occurs, the terminal device sends the identifier of the first beam to the network device by using the physical layer control signaling or the MAC layer control signaling. For another example, a first timer is set, and when the first timer expires, the terminal device sends the identifier of the first beam to the network device by using the physical layer control signaling or the MAC layer control signaling. Optionally, the first timer may be restarted for retiming after the first timer expires. For another example, a second timer is set, and when the second timer expires and a response to an identifier of a second beam is not received, the terminal device sends the identifier of the first beam to the network device by using the physical layer control signaling or the MAC layer control signaling. The second beam is a beam on which a beam failure occurs or a beam meeting the first condition. The first beam and the second beam may be the same, or may be different. Specifically, the terminal device sends the identifier of the second beam to the network device. If the terminal device does not receive the response to the identifier of the second beam before the second timer expires, the terminal device may report the second beam again (herein, the second beam and the first beam are the same), or the terminal device performs beam measurement again and reports a first beam obtained after the measurement to the network device.

Optionally, if there is currently no uplink resource available to the terminal device, the terminal device sends a first request to the network device. The first request is used to request an uplink resource. Further, the terminal device receives, from the network device, second indication information used to indicate an uplink resource. Optionally, the uplink resource is used to transmit the physical layer control signaling or the MAC layer control signaling, and the physical layer control signaling or the MAC layer control signaling includes the first beam. In a possible design, the first request is a random access preamble sequence, and is sent to the network device through a physical random access channel. In another possible design, the first request is uplink control signaling, and is sent to the network device through a physical uplink control channel.

Optionally, data (including control plane data and user plane data) in the terminal device has a sending priority. The terminal device performs resource allocation based on the uplink resource and a preset sending priority, and preferentially allocates a resource to data with a higher sending priority in descending order of sending priorities. Optionally, the preset sending priority may be specified in a protocol in advance or preconfigured by the network device. In a possible implementation, a MAC layer of the terminal device preferentially allocates a resource to data with a higher sending priority in descending order of sending priorities. Optionally, a sending priority of the MAC layer control signaling is higher than a sending priority of a buffer status report (BSR for short). Optionally, the sending priority of the MAC layer control signaling is lower than a sending priority of control signaling of an identifier of the terminal device.

Optionally, if the terminal device cannot receive an identifier of a beam serving the terminal device, the terminal device sends a connection re-establishment request to the network device. In the following cases, it may be considered that the terminal device cannot receive the identifier of the beam serving the terminal device. For example, when the terminal device sends the identifier of the first beam to the network device, the terminal device does not receive a response message for the identifier of the first beam, and the terminal device determines that current beams are all unavailable. In this case, the terminal device determines that a radio link fails, and sends the connection re-establishment request to the network device. Optionally, the connection re-establishment request may be a radio resource control (RRC for short) connection re-establishment request. For another example, when the terminal device sends a first request to the network device, where the first request is used to request an uplink resource, the terminal device does not receive a response message for the first request within specified duration, and a quantity of times that the terminal device sends the first request is greater than a preset quantity of times. In this case, the terminal device determines that a radio link fails, and sends the connection re-establishment request to the network device. Optionally, the connection re-establishment request may be an RRC connection re-establishment request. The RRC connection re-establishment request is used to re-establish an RRC connection.

Optionally, the terminal device further receives a first configuration sent by the network device, and the first configuration includes a period of window and duration of window. The measuring, by a terminal device, a beam of a network device includes: measuring, by the terminal device, the beam of the network device based on the period of window and the duration of window. According to the measurement method, the terminal device can be prevented from continually performing beam measurement, so as to reduce power consumption of the terminal device, and save power.

According to a second aspect, an embodiment of this application provides a terminal device, where the terminal device may implement any method provided in the first aspect.

In a possible design, the terminal device has a function of implementing behavior of the terminal device in any method in the first aspect, and the function may be implemented by hardware, or may be implemented by hardware by executing corresponding software. The hardware or the software includes one or more modules corresponding to the foregoing function. Optionally, the terminal device may be user equipment. The terminal device may be configured to measure a beam of a network device, for example, periodically measure the beam of the network device, or measure the beam of the network device according to an indication of the network device. Further, the terminal device sends an identifier of a first beam to the network device, and the first beam is a beam on which a beam failure occurs or a beam meeting a first condition. Optionally, the beam on which the beam failure occurs may be a beam whose reference signal received strength or reference signal received quality is lower than a first threshold. Alternatively, the beam on which the beam failure occurs may be understood as a beam whose reference signal received strength or reference signal received quality is relatively low. Optionally, the beam meeting the first condition may be a beam whose reference signal received strength or reference signal received quality is higher than a second threshold. Alternatively, the beam meeting the first condition may be understood as a beam whose reference signal received strength or reference signal received quality is relatively high. In a possible design, the identifier of the first beam is sent to the network device by using physical layer control signaling. In another possible design, the identifier of the first beam is sent to the network device by using MAC layer control signaling. For example, a MAC layer is a MAC CE. Because the terminal device may send the identifier of the first beam to the network device after measuring the beam, the network device may further manage the beam, for example, readjust a beam serving the terminal device. In addition, because the identifier of the first beam is sent to the network device by using the physical layer control signaling or the MAC layer control signaling, it can be ensured that the identifier of the first beam is quickly reported to the network device in time.

In a possible design, the terminal device includes a processor and a transceiver. The processor is configured to support the terminal device in performing a corresponding function in any method in the first aspect, for example, generating, receiving, or processing data and/or information in the method. The transceiver is configured to: support communication between the terminal device and another entity, and send or receive information or an instruction in any method in the first aspect to or from the another entity. The terminal device may further include a memory. The memory is configured to couple to the processor, and the memory stores a program instruction and data that are necessary for the terminal device.

According to a third aspect, this application provides a beam management method, including: receiving, by a network device, physical layer control signaling or MAC layer control signaling sent by a terminal device, where the physical layer control signaling or the MAC layer control signaling includes an identifier of a first beam, and the first beam is a beam on which a beam failure occurs or a beam meeting a first condition; and sending, by the network device, a response message for the identifier of the first beam to the terminal device, where the response message is used to indicate an identifier of a beam serving the terminal device.

In this application, the terminal device measures a beam of the network device, for example, periodically measures the beam of the network device, or measures the beam of the network device according to an indication of the network device. Further, the terminal device sends the identifier of the first beam to the network device, and the first beam is the beam on which the beam failure occurs or the beam meeting the first condition. Optionally, the beam on which the beam failure occurs may be a beam whose reference signal received strength or reference signal received quality is lower than a first threshold. Alternatively, the beam on which the beam failure occurs may be understood as a beam whose reference signal received strength or reference signal received quality is relatively low. Optionally, the beam meeting the first condition may be a beam whose reference signal received strength or reference signal received quality is higher than a second threshold. Alternatively, the beam meeting the first condition may be understood as a beam whose reference signal received strength or reference signal received quality is relatively high. In a possible design, the identifier of the first beam is sent to the network device by using the physical layer control signaling. In another possible design, the identifier of the first beam is sent to the network device by using the MAC layer control signaling. For example, a MAC layer is a MAC CE. After measuring the beam, the terminal device may send the identifier of the first beam to the network device by using the physical layer control signaling or the MAC layer control signaling. After receiving the physical layer control signaling or the MAC layer control signaling, the network device obtains the identifier of the first beam from the physical layer control signaling or the MAC layer control signaling. Further, the network device reconfigures a beam serving the terminal device for the terminal device based on the identifier of the first beam, and sends a response message to the terminal device. The response message is used to indicate an identifier of the beam serving the terminal device.

Optionally, the terminal device sends the identifier of the first beam to the network device only when a specified condition is met. For example, after the terminal device measures a beam and determines that a beam failure occurs, the terminal device sends the identifier of the first beam to the network device by using the physical layer control signaling or the MAC layer control signaling, in other words, the physical layer control signaling or the MAC layer control signaling is sent by the terminal device to the network device when the terminal device determines that the beam failure occurs. For another example, a first timer is set, and when the first timer expires, the terminal device sends the identifier of the first beam to the network device by using the physical layer control signaling or the MAC layer control signaling. Optionally, the first timer may be restarted for retiming after the first timer expires, in other words, the physical layer control signaling or the MAC layer control signaling is sent by the terminal device to the network device when the terminal device determines that the first timer expires. For still another example, a second timer is set, and when the second timer expires and a response to an identifier of a second beam is not received, the terminal device sends the identifier of the first beam to the network device by using the physical layer control signaling or the MAC layer control signaling. The second beam is a beam on which a beam failure occurs or a beam meeting the first condition. The first beam and the second beam may be the same, or may be different. Specifically, the terminal device sends the identifier of the second beam to the network device. If the terminal device does not receive the response to the identifier of the second beam before the second timer expires, the terminal device may report the second beam again (herein, the second beam and the first beam are the same), or the terminal device performs beam measurement again and reports a first beam obtained after the measurement to the network device. In other words, the physical layer control signaling or the MAC layer control signaling is sent by the terminal device to the network device when the terminal device determines that the second timer expires and the response to the identifier of the second beam is not received.

Optionally, if there is currently no uplink resource available to the terminal device, the terminal device sends a first request to the network device. The network device receives the first request sent by the terminal device, and the first request is used to request an uplink resource. Further, the network device sends, to the terminal device, second indication information used to indicate an uplink resource, and the terminal device receives, from the network device, the second indication information used to indicate the uplink resource. Optionally, the uplink resource is used to transmit the physical layer control signaling or the MAC layer control signaling, and the physical layer control signaling or the MAC layer control signaling includes the first beam. In a possible design, the first request is a random access preamble sequence, and is sent to the network device through a physical random access channel. In another possible design, the first request is uplink control signaling, and is sent to the network device through a physical uplink control channel.

Optionally, data (including control plane data and user plane data) in the terminal device has a sending priority. The terminal device performs resource allocation based on the uplink resource and a preset sending priority, and preferentially allocates a resource to data with a higher sending priority in descending order of sending priorities. Optionally, the preset sending priority may be specified in a protocol in advance or preconfigured by the network device. In a possible implementation, a MAC layer of the terminal device preferentially allocates a resource to data with a higher sending priority in descending order of sending priorities. Optionally, a sending priority of the MAC layer control signaling is higher than a sending priority of a buffer status report (BSR for short). Optionally, the sending priority of the MAC layer control signaling is lower than a sending priority of control signaling of an identifier of the terminal device.

Optionally, if the terminal device cannot receive an identifier of a beam serving the terminal device, the terminal device sends a connection re-establishment request to the network device, and the network device receives the connection re-establishment request sent by the terminal device. In the following cases, it may be considered that the terminal device cannot receive the identifier of the beam serving the terminal device. For example, when the terminal device sends the identifier of the first beam to the network device, the terminal device does not receive a response message for the identifier of the first beam, and the terminal device determines that current beams are all unavailable. In this case, the terminal device determines that a radio link fails, and sends the connection re-establishment request to the network device. Optionally, the connection re-establishment request may be a radio resource control (RRC for short) connection re-establishment request. For another example, when the terminal device sends a first request to the network device, where the first request is used to request an uplink resource, the terminal device does not receive a response message for the first request within specified duration, and a quantity of times that the terminal device sends the first request is greater than a preset quantity of times. In this case, the terminal device determines that a radio link fails, and sends the connection re-establishment request to the network device. Optionally, the connection re-establishment request may be an RRC connection re-establishment request.

Optionally, the network device sends a first configuration to the terminal device, the terminal device receives the first configuration sent by the network device, and the first configuration includes a period of window and duration of window. That the terminal device measures a beam of the network device includes: measuring, by the terminal device, the beam of the network device based on the period of window and the duration of window. According to the measurement method, the terminal device can be prevented from continually performing beam measurement, so as to reduce power consumption of the terminal device, and save power.

According to a fourth aspect, an embodiment of this application provides a network device, where the network device may implement any method provided in the third aspect.

In a possible design, the network device has a function of implementing behavior of the network device in any method in the third aspect, and the function may be implemented by hardware, or may be implemented by hardware by executing corresponding software. The hardware or the software includes one or more modules corresponding to the foregoing function. Optionally, the network device may be a base station, a transmission point, or the like. The network device may be configured to: after receiving physical layer control signaling or MAC layer control signaling, obtain an identifier of a first beam from the physical layer control signaling or the MAC layer control signaling; further, reconfigure a beam serving the terminal device for the terminal device based on the identifier of the first beam; and send a response message to the terminal device. The response message is used to indicate an identifier of the beam serving the terminal device.

In a possible design, a structure of the network device includes a processor and a transceiver. The processor is configured to support the network device in performing a corresponding function in any method in the third aspect, for example, generating, receiving, or processing data and/or information in the method. The transceiver is configured to: support communication between the network device and another entity, and send or receive information or an instruction in any method in the third aspect to or from the another entity. The network device may further include a memory. The memory is configured to couple to the processor, and the memory stores a program instruction and data that are necessary for the network device.

According to a fifth aspect, an embodiment of this application provides a computer storage medium, configured to store a computer software instruction used by the terminal device provided in the second aspect. The computer software instruction includes a program designed for performing the first aspect.

According to a sixth aspect, an embodiment of this application provides a computer storage medium, configured to store a computer software instruction used by the network device provided in the fourth aspect. The computer software instruction includes a program designed for performing the third aspect.

According to a seventh aspect, this application further provides a computer program product including an instruction. When the computer program product is run on a computer, the computer is enabled to perform the method in the first aspect. The computer program product includes a computer executable instruction, and the computer executable instruction is stored in a computer-readable storage medium. A processor of a terminal device may read the computer executable instruction from the computer-readable storage medium. The processor executes the computer executable instruction, so that the terminal device is enabled to perform the steps performed by the terminal device in the foregoing method provided in the embodiments of this application, or the terminal device is enabled to deploy functional units corresponding to the steps.

According to an eighth aspect, this application further provides a computer program product including an instruction. When the computer program product is run on a computer, the computer is enabled to perform the method in the third aspect. The computer program product includes a computer executable instruction, and the computer executable instruction is stored in a computer-readable storage medium. A processor of a network device may read the computer executable instruction from the computer-readable storage medium. The processor executes the computer executable instruction, so that the network device is enabled to perform the steps performed by the network device in the foregoing method provided in the embodiments of this application, or the network device is enabled to deploy functional units corresponding to the steps.

According to a ninth aspect, this application further provides a chip system. The chip system includes a processor, configured to support a terminal device in implementing functions in the foregoing aspects, for example, generating, receiving, or processing data and/or information in the foregoing methods. In a possible design, the chip system further includes a memory, and the memory is configured to store a program instruction and data that are necessary for the terminal device. The chip system may include a chip, or may include a chip and another discrete device.

According to a tenth aspect, this application further provides a chip system. The chip system includes a processor, configured to support a network device in implementing functions in the foregoing aspects, for example, generating, receiving, or processing data and/or information in the foregoing methods. In a possible design, the chip system further includes a memory, and the memory is configured to store a program instruction and data that are necessary for the network device. The chip system may include a chip, or may include a chip and another discrete device.

BRIEF DESCRIPTION OF THE DRAWINGS

The following describes in more details the embodiments of this application with reference to the accompanying drawings.

DETAILED DESCRIPTION OF ILLUSTRATIVE EMBODIMENTS

The following clearly describes the technical solutions in the embodiments of this application with reference to the accompanying drawings in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of network architectures and emergence of new service scenarios, the technical solutions provided in the embodiments of this application are also applicable to similar technical problems.

This application may be applied to existing cellular communications systems, for example, a global system for mobile communications (GSM for short), a wideband code division multiple access (WCDMA for short) system, or a long term evolution (LTE for short) system. This application is applicable to a fifth-generation (5G for short) mobile communications system, for example, a communications system in which a new radio (NR for short) access network, a cloud radio access network (CRAN for short), and the like are used, and may also be extended to a similar wireless communications system, for example, a wireless fidelity (WiFi for short) system, a worldwide interoperability for microwave access (WiMAX for short) system, a third-generation partnership project (3GPP for short), and other related cellular systems. This application is also applicable to another wireless communications system in which an orthogonal frequency division multiplexing (OFDM for short) access technology is used, and is further applicable to a future wireless communications system.

Embodiments of the present invention is applicable to a multi-beam operating system, and is also applicable to a single-beam operating system. Different beam parameters correspond to different synchronization signals, CSI-RSs, or other reference signal-related sending parameters, and usually include a sending period, a time offset, and a sequence or a pattern corresponding to a signal.

Figure 1:
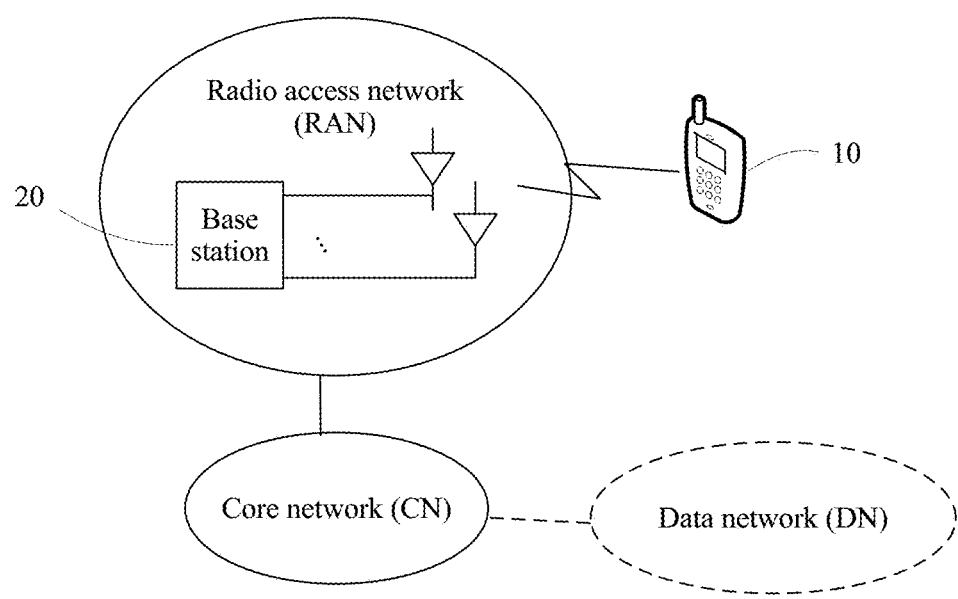
FIG. 1 is a schematic diagram of an application scenario according to this application.

FIG. 1 is a schematic diagram of a possible application scenario according to this application. At least one terminal device 10 communicates with a radio access network (RAN for short) through a radio interface. The RAN includes at least one network device 20, and the network device is, for example, a base station. For clarity, only one base station and only one terminal device are shown in the figure. The terminal device 10 may further communicate with another terminal device 10, for example, in a device-to-device (D2D for short) or machine-to-machine (M2M for short) scenario. The network device 20 may communicate with the terminal device 10, and may also communicate with another network device 20, for example, communication between a macro base station and an access point. The RAN is connected to a core network (CN for short). Optionally, the CN may be coupled to one or more data networks (DN for short), for example, the Internet and a public switched telephone network (PSTN for short).

In this application, terms "network" and "system" are frequently interchangeably used, but a person skilled in the art may understand meanings of the terms.

To facilitate understanding, the following describes some terms in this application.

(1) Terminal device: The terminal device (Terminal Equipment) is also referred to as user equipment (UE for short) or a terminal (Terminal), and is a device that provides voice and/or data connectivity for a user, for example, a handheld device, a vehicle-mounted device, a wearable device, a computing device, or a control device that has a wireless connection function or a wireless communication function, another processing device connected to a wireless modem, and mobile stations (MS for short) in various forms. Common terminal devices include a mobile phone (phone), a tablet computer (pad), a notebook (notebook) computer, a palmtop computer, a mobile internet device (MID for short), and a wearable device such as a smartwatch, a smart band, or a pedometer. For ease of description, the devices mentioned above are collectively referred to as the terminal device in this application.

(2) Network device: The network device may be, for example, a base station. The base station is also referred to as a RAN device, and is a device through which a terminal device accesses a radio network. The base station includes but is not limited to an evolved NodeB (eNB for short), a radio network controller (RNC for short), a NodeB (NB for short), a base station controller (BSC for short), a base transceiver station (BTS for short), a home base station (Home evolved NodeB or Home NodeB, HNB for short), a baseband unit (BBU for short), a gNodeB (gNB for short), a transmission and reception point (TRP for short), a transmission point (TP for short), a mobile switching center, and the like. In addition, the base station may further include a Wifi access point (AP for short) and the like. An apparatus that directly communicates with the terminal device through a radio channel is usually a base station. The base station may include macro base stations, micro base stations, relay stations, access points, remote radio units (RRU for short), and the like in various forms. Certainly, another network device having a wireless communication function may also communicate with the terminal device wirelessly. This is not limited in this application. In different systems, a device having a base station function may have different names. For example, in an LTE network, the device is referred to as an evolved NodeB (eNB or eNodeB), and in a third-generation (3G) network, the device is referred to as a NodeB.

The following explains some common concepts or definitions in the embodiments of this application. It should be noted that some English abbreviations in an LTE system are used as examples in this specification to describe the embodiments of this application, and the abbreviations may vary with evolution of networks. For specific evolution, refer to descriptions in corresponding standards.

In this application, a beam may be understood as a spatial resource, and may be a transmit or receive precoding vector having an energy transmission directivity. In addition, the transmit or receive precoding vector can be identified by using index information. The energy transmission directivity may mean that precoding processing is performed, by using the precoding vector, on a signal that needs to be sent. A signal obtained after the precoding processing has a specific spatial directivity. The signal that is received and on which precoding processing is performed by using the precoding vector has relatively high receive power, for example, satisfies a receive demodulation signal-to-noise ratio. The energy transmission directivity may also mean that a same signal that is sent at different spatial locations and that is received by using the precoding vector has different receive power. Optionally, a same communications device (such as a terminal device or a network device) may have different precoding vectors, and different communications devices may also have different precoding vectors, in other words, correspond to different beams. The beam may have a plurality of names. For example, the beam may be referred to as a spatial resource, a spatial weight, a spatial direction, a spatial orientation, or the like. With development of technologies, the beam may have different names in different scenarios at different moments. This is not limited in this application.

For a configuration or a capability of a communications device, one communications device may use one or more of a plurality of different precoding vectors at a same moment, in other words, obtain one or more beams at a same moment. Beam information may be identified by using index information. Optionally, the index information may correspond to a configured resource identity (ID for short) of the terminal device. For example, the index information may correspond to an ID, an index, or a resource of a configured channel state information-reference signal (CSI-RS for short), or may correspond to an ID or a resource of a configured uplink sounding reference signal (SRS for short). Alternatively, the index information may be index information explicitly or implicitly carried by a signal or a channel carried on a beam. For example, the index information includes but is not limited to index information of the beam that is indicated by a synchronization signal or a broadcast channel transmitted by using the beam. For example, a high-frequency cell may be understood as a cell whose working frequency band is a frequency band greater than or equal to 6 GHz. When data is transmitted at a high frequency, a path loss during transmission is usually relatively large. To ensure effective service transmission, a beamforming technology may be introduced into the high-frequency cell. In this technology, signal energy is gathered in a required direction or beam to form a beam aligned with the terminal device, and transmit energy is aligned with the terminal device, so that a demodulation signal-to-noise ratio of the terminal device is improved, thereby improving cell edge user experience. A beam pair may be used for high-frequency data transmission. A transmit end sends data in a direction or beam, and a receive end also needs to receive the data in a corresponding direction or beam. The terminal device and the network device may be in a same time unit, and may transmit data by using a Tx beam in at least one beam pair. The beam pair includes a transmit beam (Tx beam) and a beam (Rx beam). For example, the network device (for example, the gNB) may be the Tx beam and the terminal device (for example, the UE) may be the Rx beam, or the terminal device (for example, the UE) is the Tx beam and the network device (for example, the gNB) is the Rx beam.

In NR, to improve transmission robustness, connections to a plurality of downlink and/or uplink serving beam pairs of a cell may be maintained between the UE and at least one TRP. A serving beam pair is a beam pair for providing a radio resource for UE in a connected mode or an activated mode. The UE in the connected mode is UE that maintains an RRC connection between the UE and an access network device, and a connection between the access network device and a core network device. The UE in the activated mode is UE that maintains the connection between the access network device and the core network device, and maintains no RRC connection between the UE and the access network device. UE in an idle mode is UE that maintains no connection between the access network device and the core network device, and no RRC connection between the UE and the access network device. The at least one TRP may be at different geographical locations, to expand cell coverage. Therefore, in some scenarios, channel conditions connected to downlink serving beam pairs between different TRPs and the UE may be independent of each other. In this case, when the UE moves to a new location, channel quality of some serving beam pairs, for example, a path loss, may possibly decrease because of temporary blocking such as tree blocking, and consequently a beam failure (beam failure) occurs. However, channel quality of some other serving beams remains high. The serving beam or the serving beam pair is a beam or a beam pair that may provide a radio resource for the UE in the connected mode or the UE in the activated mode, and the serving beam includes an uplink serving beam and/or a downlink serving beam.

For a downlink beam, the terminal device and the network device maintain a same downlink serving beam set. The downlink serving beam set is used to indicate an available downlink serving beam between the terminal device and the network device. The downlink serving beam is a beam in a downlink direction that may be used by the network device to provide a service for the terminal device. For example, the network device may send downlink control signaling to the terminal device on the downlink serving beam, and the like.

Because of movement of the terminal device and the like, a failure occurs on some beams in the downlink serving beam set. In this case, the terminal device can measure, in time, the beams on which the beam failure occurs, and report a measurement result to the network device. The network device reconfigures a beam for the terminal device based on the measurement result reported by the terminal device, so as to ensure quality of communication between the network device and the terminal device.

The following describes in more detail the solutions provided in the embodiments of this application with reference to the accompanying drawings.

Figure 2:
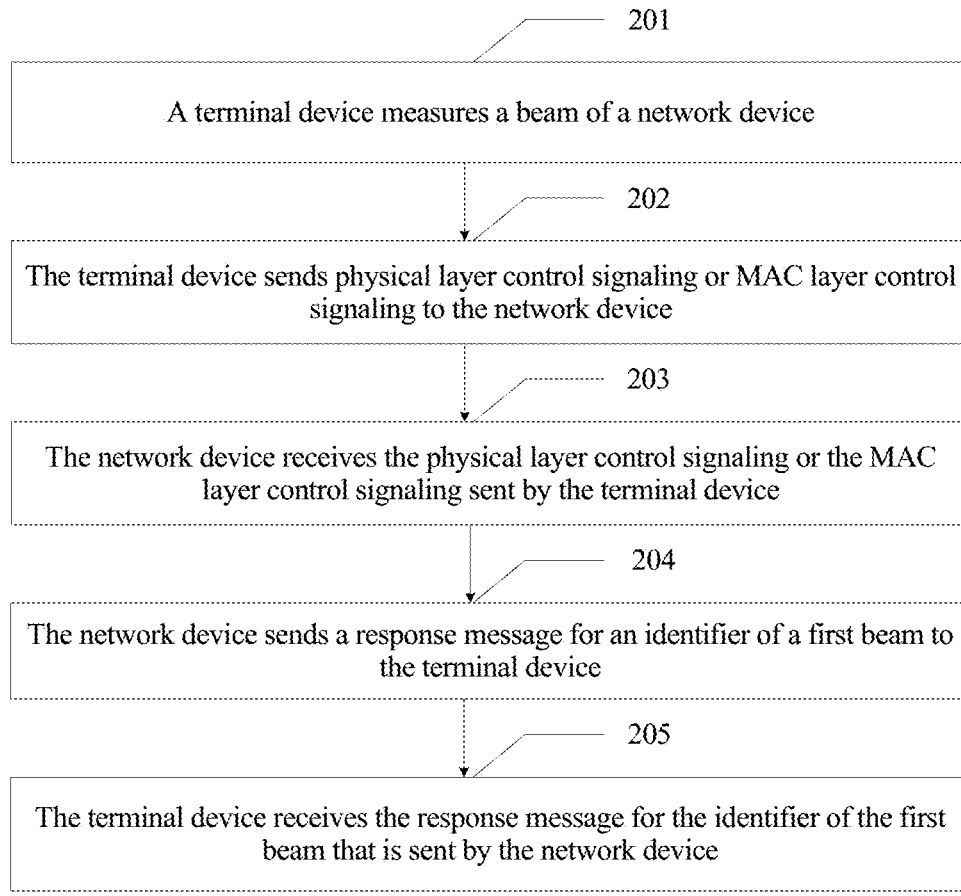
FIG. 2 is a flowchart of a beam management method according to this application.

FIG. 2 is a flowchart of a beam management method according to this application, and the method includes the following steps.

Step 201: A terminal device measures a beam of a network device.

Optionally, the terminal device may periodically measure the beam of the network device, or measure the beam of the network device according to an indication of the network device. Optionally, the terminal device may obtain, through measurement, a beam on which a beam failure occurs. The beam on which the beam failure occurs may be a beam whose reference signal received strength RSRP or reference signal received quality RSRQ is less than a first threshold, or a beam whose reference signal received strength RSRP or reference signal received quality RSRQ is always less than a first threshold within a preset time. Alternatively, the beam on which the beam failure occurs may be understood as a beam whose reference signal received strength or reference signal received quality is relatively low. Optionally, the terminal device may further obtain, through measurement, a beam meeting a first condition. The beam meeting the first condition may be a beam whose reference signal received strength or reference signal received quality is greater than a second threshold. Alternatively, the beam meeting the first condition may be understood as N beams whose reference signal received strength or reference signal received quality is relatively high, where N is greater than or equal to 1. The first condition may also be referred to as a quality condition or a quality requirement.

Step 202: The terminal device sends physical layer control signaling or MAC layer control signaling to the network device.

Content included in the physical layer control signaling or the MAC layer control signaling may include the following several optional solutions:

Optionally, the terminal device sends the physical layer control signaling to the network device. The physical layer control signaling includes an identifier of a first beam, and the first beam is the beam on which the beam failure occurs.

Optionally, the terminal device sends the physical layer control signaling to the network device. The physical layer control signaling includes an identifier of a first beam, and the first beam is the beam meeting the first condition.

Optionally, the terminal device sends the physical layer control signaling to the network device. The physical layer control signaling includes an identifier of a first beam, and the first beam is the beam on which the beam failure occurs or the beam meeting the first condition.

Optionally, the terminal device sends the MAC layer control signaling to the network device. The MAC layer control signaling includes an identifier of a first beam, and the first beam is the beam on which the beam failure occurs.

Optionally, the terminal device sends the MAC layer control signaling to the network device. The MAC layer control signaling includes an identifier of a first beam, and the first beam is the beam meeting the first condition.

Optionally, the terminal device sends the MAC layer control signaling to the network device. The MAC layer control signaling includes an identifier of a first beam, and the first beam is the beam on which the beam failure occurs or the beam meeting the first condition.

To be specific, when determining that there is an uplink resource, the terminal device generates the physical layer control signaling or the MAC layer control signaling based on the uplink resource, where the physical layer control signaling or the MAC layer control signaling includes the identifier of the first beam, and sends the identifier of the first beam to the network device.

Optionally, the first beam is at least one beam.

Optionally, that the physical layer control signaling or the MAC layer control signaling includes the identifier of the first beam may be further understood as that the physical layer control signaling or the MAC layer control signaling includes a beam report or a beam recovery report. The beam report or the beam recovery report includes the identifier of the first beam. Alternatively, that the physical layer control signaling or the MAC layer control signaling includes the identifier of the first beam may be understood as that the identifier of the first beam is reported in a form of a measurement report.

Optionally, the uplink resource may include some or all of the following content: a transport block size, a physical time-frequency resource block (for example, a quantity), information used to indicate new transmission or retransmission, a modulation and coding scheme, a hybrid automatic repeat request (HARQ for short) process ID, and a redundancy version. The uplink resource may be a dynamically scheduled uplink resource, or may be a semi-statically scheduled uplink resource, or may be a contention-based uplink resource (an uplink resource shared by a plurality of terminals, for example, a grant-free resource).

Optionally, the uplink resource may be used to indicate an uplink transmission resource of a primary cell or a secondary cell. The primary cell (PCell for short) is a cell operating on a primary frequency, where the primary cell is a cell in which the terminal device may perform an initial connection establishment process or initiate a connection re-establishment process, or a cell indicated as a primary cell in a switching process. The secondary cell (SCell for short) is a cell operating on a secondary frequency, and provides an additional radio resource for UE in a connected mode.

Step 203: The network device receives the physical layer control signaling or the MAC layer control signaling sent by the terminal device.

The network device may obtain the identifier of the first beam by parsing the physical layer control signaling or the MAC layer control signaling, to learn of at least one downlink serving beam on which a beam failure occurs, and/or the beam meeting the first condition.

The network device may delete, from a downlink serving beam set of the network device based on the identifier of the first beam, the at least one downlink serving beam on which the beam failure occurs. Optionally, the network device may further add a downlink beam meeting the first condition to the downlink serving beam set.

Optionally, the identifier of the first beam may be a beam identifier, or may be an SS-block identifier. The SS-block identifier may be a time index of an SS-block, and the time index is carried on a PBCH of the SS-block. The SS-block may include at least one of a primary synchronization signal (PSS for short), a secondary synchronization signal (SSS for short), and a physical broadcast channel (PBCH for short).

Optionally, after step 203, the method further includes the following step: Step 204: The network device sends a response message for an identifier of the first beam to the terminal device.

The response message is used to indicate an identifier of a beam serving the terminal device. Optionally, the beam that serves the terminal device and that is indicated by using the response message may include the beam that meets the first condition and that is reported by the terminal device, or may not include the beam that meets the first condition and that is reported by the terminal device. Optionally, the response message further includes an identifier of a beam that needs to be deleted, and the beam that needs to be deleted is at least one of beams on which a beam failure occurs. Optionally, the response message for the identifier of the first beam may be further understood as a response message for the beam report or a response message for the beam recovery report.

Optionally, after step 204, the method further includes the following step: Step 205: The terminal device receives the response message for the identifier of the first beam that is sent by the network device.

Optionally, when receiving the response message, the terminal device may or may not modify or adjust a beam in the downlink serving beam set of the terminal device, so that the terminal device can correctly or effectively receive data sent by the network device on at least one downlink beam. The at least one downlink beam is indicated by the network device by using the response message. Optionally, the data includes downlink control plane data and/or user plane data.

The modification or adjustment operation includes: (1) If the identifier of the beam that serves the terminal device and that is indicated by using the response message is different from identifiers of some beams in the downlink serving beam set of the terminal device, the terminal device partially adjusts (adds or deletes) the beams in the downlink serving beam set based on the response message, for example, modifies angles or phases of the beams in the downlink serving beam set. (2) If the identifier of the beam that serves the terminal device and that is indicated by using the response message is different from identifiers of all beams in the downlink serving beam set of the terminal device, the terminal device partially or completely adjusts (adds or deletes) all the beams in the downlink serving beam set based on the response message, for example, modifies phases or angles of receive beams. (3) If the identifier of the beam that serves the terminal device and that is indicated by using the response message is the same as identifiers of all beams in the downlink serving beam set of the terminal device, the terminal device does not adjust all the beams in the downlink serving beam set based on the response message. It should be understood that the three cases are merely used as examples for description herein, and there may be actually another appropriate adjustment or modification operation. This does not constitute a limitation on this embodiment of this application.

Optionally, the response message sent by the network device may include an identifier of the at least one downlink beam, so as to notify the terminal device of a downlink beam used to serve the terminal device. Herein, the at least one downlink beam may be understood as a beam used by the terminal device to update the downlink serving beam set of the terminal device.

Optionally, the response message may be an uplink grant or a downlink assignment.

Optionally, the response message may be sent by the network device by using the physical layer signaling or a MAC CE.

Optionally, step 202 is performed only when a specific condition is met. To be specific, only when a specific condition is met, the terminal device is triggered to send the identifier of the first beam to the network device. For example, after the terminal device measures a beam and determines that a beam failure occurs, the terminal device is triggered to send the identifier of the first beam to the network device by using the physical layer control signaling or the MAC layer control signaling. Optionally, if reference signal received strength or reference signal received quality of a serving beam of the terminal device is less than the first threshold within preset duration, the terminal device determines that a beam failure occurs. Optionally, a reference signal of the serving beam may be a reference signal of a control channel and/or a data channel. Optionally, if M serving beams are configured for the terminal device, and reference signal received strength or reference signal received quality of N DL beams is less than a preset threshold within preset duration, the terminal device determines that a beam failure occurs, where M is greater than N, and M and N are integers and may be both set by a network. The reference signal may be at least one of a synchronization signal (PSS/SSS), a CSI-RS, a cell reference signal (CRS for short), a beam reference signal (BRS for short), and a demodulation reference signal (DMRS for short). For another example, a first timer is started or restarted, and when the first timer expires, the terminal device is triggered to send the identifier of the first beam to the network device by using the physical layer control signaling or the MAC layer control signaling. Optionally, when the MAC layer control signaling is generated, the first timer may be restarted for retiming.

For another example, a second timer is started or restarted, and when the second timer expires and a response to an identifier of a second beam is not received, the terminal device is triggered to send the identifier of the first beam to the network device by using the physical layer control signaling or the MAC layer control signaling. Optionally, when the MAC layer control signaling is generated, the second timer may be restarted for retiming. The second beam is a beam on which a beam failure occurs or a beam meeting the first condition. The first beam and the second beam may be the same, or may be different. Specifically, the terminal device sends the identifier of the second beam to the network device. If the terminal device does not receive the response to the identifier of the second beam before the second timer expires, the terminal device may report the second beam again (herein, the second beam and the first beam are the same), or the terminal device performs beam measurement again and reports a first beam obtained after the measurement to the network device.

Optionally, after step 201, if the terminal device determines that there is no available uplink resource, before the terminal device performs step 202, the method further includes: sending, by the terminal device, a first request to the network device, where the first request is used to request an uplink resource; and further, receiving, by the terminal device from the network device, second indication information used to indicate an uplink resource. Optionally, the uplink resource is used to transmit the physical layer control signaling or the MAC layer control signaling, and the physical layer control signaling or the MAC layer control signaling includes the identifier of the first beam. In a possible design, the first request is a random access preamble sequence, and is sent to the network device through a physical random access channel, and the second indication information used to indicate the uplink resource that is included in a response message for the random access preamble sequence that is sent by the network device is received. In another possible design, the first request is uplink control signaling, and is sent to the network device through a physical uplink control channel.

The following describes the foregoing method steps with reference to a specific example.

It is assumed that the terminal device maintains two serving beams that are specifically a beam 1 and a beam 2, in other words, the downlink serving beam set of the terminal device is {beam 1, beam 2}. Similarly, a downlink serving beam set of the network device for the terminal device is also {beam 1, beam 2}.

The terminal device listens to PDCCHs on the beam 1 and the beam 2, to obtain possible downlink control signaling such as a downlink assignment or an uplink grant UL grant. The terminal device moves to a new location, and determines, through measurement, that signal quality or strength of the beam 1 and the beam 2 becomes lower (for example, the signal quality or strength of the beam 1 and the beam 2 is less than a threshold). Therefore, the terminal device determines that a beam failure occurs, and the terminal device determines that signal quality or strength of a beam 3 is higher. Therefore, it may be considered that the beam 3 is used as a new serving beam.

For measurement in a high-frequency cell, because the terminal device determines that the beam failure occurs, there are two cases:

(1) If the terminal device receives a UL grant sent by the network device, the terminal device generates the physical layer control signaling or the MAC layer control signaling based on the UL grant. The physical layer control signaling or the MAC layer control signaling includes the identifier of the first beam. The identifier of the first beam is an identifier of the beam 1 and an identifier of the beam 2, or is an identifier of the beam 1, an identifier of the beam 2, and an identifier of the beam 3, or is an identifier of the beam 3. The terminal device sends the physical layer control signaling or the MAC layer control signaling to the network device. The physical layer control signaling or the MAC layer control signaling may be used to notify the network device that the signal strength or quality of the beam 1 and the beam 2 is lower, and the signal quality of the beam 3 is higher. The network device determines, based on the physical layer control signaling or the MAC layer control signaling, not to send the downlink control signaling to the terminal device by using the beam 1 and the beam 2, uses the beam 3 as a beam 3 serving the terminal device, and subsequently, sends the downlink control signaling to the terminal device by using the beam 3. After receiving a response to the physical layer control signaling or the MAC layer control signaling that is sent by the network device, the terminal device does not listen to the PDCCHs on the beam 1 and beam 2, but listens to a PDCCH on the beam 3. In addition, the terminal device and the network device separately adjust their respective downlink serving beam sets to {beam 3}.

(2) If the terminal device does not receive a UL grant sent by the network device, the terminal device is triggered to send the first request to the network device through the physical uplink control channel (PUCCH for short) or the physical random access channel (PRACH for short). The first request is used to request the uplink resource. After requesting the uplink resource, the terminal device may further send the physical layer control signaling or the MAC layer control signaling that includes the identifier of the first beam to the network device according to (1).

For step 202, in a possible implementation, the terminal device may further send the MAC layer control signaling to the network device in the following manner:

Optionally, data (including control plane data and user plane data) in the terminal device has a sending priority. The terminal device performs resource allocation based on the uplink resource and a preset sending priority, and preferentially allocates a resource to data with a higher sending priority in descending order of sending priorities. Optionally, the preset sending priority may be specified in a protocol in advance or preconfigured by the network device. In a possible implementation, a MAC layer of the terminal device preferentially allocates a resource to data with a higher sending priority in descending order of sending priorities. Optionally, a sending priority of the MAC layer control signaling is higher than a sending priority of a buffer status report (BSR for short). Optionally, the sending priority of the MAC layer control signaling is lower than a sending priority of control signaling of an identifier of the terminal device.

For example, the preset sending priorities in descending order are successively as follows:

1. C-RNTI control signaling or UL-CCCH data;
2. Control signaling of the identifier of the first beam;
3. BSR control signaling; and
4. Logical channel data other than the UL-CCCH data.

The uplink common control channel (UL-CCCH for short) data is SRB data, and may be further understood as RRC layer data, for example, a connection establishment request message or a connection re-establishment request message. A cell radio network temporary identifier (C-RNTI for short) is the identifier of the terminal device, is used by the network device to identify an identity of the terminal device, and is mainly used in a random access procedure. A BSR, namely, a buffer status report, is scheduling reference information of the network device, and is used to report an amount of data in an uplink cache of the terminal device that currently needs to be transmitted. The network device allocates an uplink transmission resource based on the BSR reported by the terminal device, so as to avoid a radio resource waste. The logical channel data other than the UL-CCCH data is common user plane data.

Reporting may be performed at a granularity of a logical channel group or a logical channel. The terminal device multiplexes and assembles data for resource allocation, to generate a MAC packet such as a transport block or a MAC protocol data unit (PDU for short). The terminal device sends the MAC packet to the network device based on the uplink resource.

It may be understood that the terminal device may perform some or all priority operations based on the preset priority in the foregoing embodiment, and these operations are only examples. In this embodiment of the present invention, another operation or various variants thereof may be further performed, and all the priority operations in the foregoing embodiment do not necessarily need to be performed. For example, priorities are as follows: 1>2>3 without considering 4.

The following provides a description with reference to a specific example.

Figure 3:
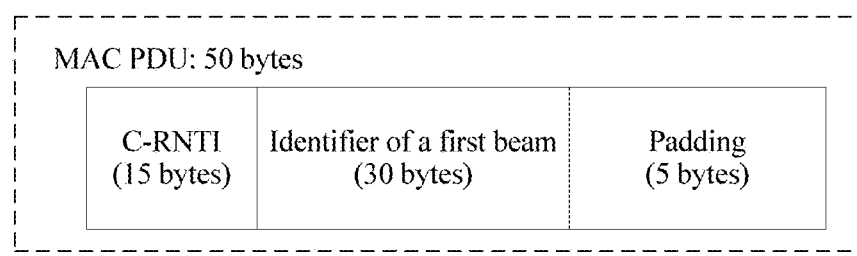
FIG. 3 is a schematic diagram of a MAC PDU according to this application.

It is assumed that a transport block size included in the uplink transmission resource is 50 bytes, in other words, the radio transmission resource may transmit 50-byte data at most. It is assumed that the C-RNTI requires a 15-byte resource, the identifier of the first beam requires a 30-byte resource, and the BSR requires a 10-byte resource. The transport block size included in the uplink transmission resource allocated by the network device cannot be used to simultaneously report the C-RNTI, the identifier of the first beam, and the BSR. Therefore, the terminal device preferentially allocates a resource to data with a higher priority based on priorities: the C-RNTI>the identifier of the first beam>the BSR. To be specific, a 15-byte resource is allocated to the C-RNTI, and then a 30-byte resource from the remaining 35-byte resource is allocated to the identifier of the first beam. Because the remaining 5-byte resource is not enough to report the BSR, the BSR is not reported, but some padding data may be reported. In this case, a MAC PDU is formed, which is shown in FIG. 3.

In a possible implementation, the terminal device may send the first request to the network device in the following manner:

(1) The first request is a random access preamble sequence.

When the first request is the random access preamble sequence, a specific implementation process includes the following steps:

Step 1: The terminal device receives random access configuration information sent by the network device.

The configuration information includes N pieces of RACH configuration information (including an RACH time-frequency resource, and optionally, further including a preamble group), and the N pieces of RACH configuration information are associated with identification information of a downlink beam that is used to send an SS-Block or a first CSI-RS. The identification information of the DL beam may be a time index on the PBCH.

Step 2: The terminal device performs beam measurement based on an SS-block or a first CSI-RS, to determine an available downlink beam or a best downlink beam.

The terminal device determines, based on an identifier of the available downlink beam or the best downlink beam, an RACH configuration associated with the identifier of the available downlink beam or the best downlink beam, and sends a preamble to the network device by using the RACH configuration.

Step 3: The terminal device receives, on the downlink beam, a random access response message sent by the network device, where the random access response message includes an uplink grant, an uplink timing advance, and the like.

Specifically, after the terminal device sends the random access preamble sequence, the terminal device listens to, within a random access response window, the PDCCH by using an RA-RNTI, to receive the random access response message sent by the network device for the random access preamble sequence. Duration of the random access response window may be specified in advance or preconfigured by a network.

The RA-RNTI may be calculated according to the following formulas:

The RA-RNTI may be obtained by using parameters t_id, f_id, and slot_id.

The RA-RNTI may be obtained by using parameters t_id, f_id, and symbol_id.

The RA-RNTI may be obtained by using parameters t_id, f_id, slot_id, and symbol_id.

Therefore, $$RA\text{-}RNTI=1+a*t\_id+b*symbol\_id+c*f\_id+d*slot\_id,$$

where a, b, c, and d are natural numbers or nonnegative integers. In the solutions of embodiments of the present invention, any combination of the foregoing formulas is included.

For example, a possible combination form is as follows:

$$RA\text{-}RNTI=1+t\_id+max\_t*time\_unit\_id+(max\_t+ max\_t*max\_time\_unit)*f\_id, \text{ where}$$

t_id is a subframe number of a first subframe in which a PRACH resource is located, and is an integer; max_t is a quantity of subframes of one radio frame; time_unit_id is an integer, and is a time_unit number of a first time_unit of the first subframe in which the PRACH resource is located, where the time_unit may be a slot or a symbol (a slot or a symbol of a reference subcarrier spacing), or a future possible time granularity; max_time_unit is a quantity of time_units in one subframe, and is an integer; and f_id is an index of a frequency domain resource in which the PRACH resource is located.

For example, another possible combination form is as follows:

$$RA\text{-}RNTI=1+t\_id+max\_t*f\_id+(max\_t+ max\_t*max\_f)*time\_unit\_id,$$

where t_id is a subframe number of a first subframe in which a PRACH resource is located, and is an integer; max_t is a quantity of subframes of one radio frame; time_unit_id is an integer, and is a time_unit number of a first time_unit of the first subframe in which the PRACH resource is located, where the time_unit may be a slot or a symbol, or a future possible time granularity; max_time_unit is a quantity of time_units in one subframe, and is an integer; and f_id is an index of a frequency domain resource in which the PRACH resource is located.

Optionally, the RAR may further include at least one piece of second CSI-RS configuration information so that the terminal device performs beam measurement based on the CSI-RS. Any one piece of second CSI-RS configuration information may further include identification information of the second CSI-RS configuration information, for example, a CSI-RS index. The RAR may further include an N value. The N value is used by the terminal device to synthesize reference signal received power and/or reference signal received quality of N beams into reference signal received power and/or reference signal received quality of a cell. The N value may also be obtained from a system message.

Step 4: The terminal device sends the identifier of the first beam to the network device based on the uplink grant included in the random access response.

Optionally, that the identifier of the first beam may be sent by using the MAC control signaling may be further understood as sending the beam report or sending the beam recovery report.

Optionally, in an alternative solution of step 4, the terminal device sends an identifier of a third beam to the network device.

The third beam is some or all of beams that are corresponding to a configuration identifier of a second CSI-RS and that meet a second condition. The configuration identifier of the second CSI-RS may be a CSI-RS index. The second condition is configuration identifiers of N second CSI-RSs whose signal quality or strength is measured based on the second CSI-RS and is relatively high, or configuration identifiers of N second CSI-RSs whose signal quality or strength is measured based on the second CSI-RS and is greater than a threshold.

Optionally, the terminal device further sends, to the network device, reference signal received power (RSRP for short) and/or reference signal received quality (RSRQ for short) of a beam based on the second CSI-RS. Optionally, the terminal device further sends, to the network device, reference signal received power (RSRP for short) and/or reference signal received quality (RSRQ for short) of a cell based on the second CSI-RS.

Step 5: The terminal device receives a contention resolution message sent by the network device. The contention resolution message may be downlink control signaling scrambled by using the C-RNTI, for example, the UL grant or the DL assignment. Optionally, the contention resolution message may further carry a response message for the identifier of the first beam or the configuration identifier of the second CSI-RS.

Optionally, the terminal device receives, in the first beam or a receive beam associated with the configuration identifier of the second CSI-RS, the contention resolution message sent by the network device.

(2) The first request is the physical layer control signaling.

Step 1: The terminal device sends a first request to the network device through a physical uplink control channel.

Step 2: The terminal device receives an uplink grant sent by the network device.

Step 3: The terminal device sends the identifier of the first beam to the network device based on the uplink grant included in a random access response.

Step 4: The terminal device receives the response message sent by the network device for the identifier of the first beam.

Two possible implementations in which the terminal device sends the first request to the network device are described above. Certainly, the foregoing two implementations do not constitute a limitation in actual application.

Optionally, the physical uplink control channel may be located in the primary cell or the secondary cell.

Optionally, in a possible implementation, after step 201, if the terminal device determines that there is no available uplink resource, the terminal device does not perform step 202 to step 204, but performs the following steps:

Step 1: The terminal device sends a second request to the network device through a physical uplink control channel, where the second request message carries an identifier of a first beam.

Optionally, the second request is uplink control signaling.

Step 2: The terminal device receives a response message sent by the network device for the identifier of the first beam.

In this implementation, the terminal device sends the identifier of the first beam to the network device by using the second request. Therefore, there is no need to request an uplink resource, so as to reduce overheads and increase a processing speed.

Optionally, the physical uplink control channel may be located in the primary cell or the secondary cell.

In any one of the foregoing implementation solutions, optionally, when being to send the response message for the first beam to the terminal device, the network device may further add configuration information of the CSI-RS to the response message, so that the terminal device performs beam measurement based on the CSI-RS. The terminal device receives the configuration information, performs beam measurement, generates a measurement result, and sends a CSI-RS-based beam measurement result to the network device.

Optionally, in any one of the foregoing implementations, if the terminal device cannot receive the identifier of the beam serving the terminal device, the terminal device sends a connection re-establishment request to the network device. In the following cases, it may be considered that the terminal device cannot receive the identifier of the beam serving the terminal device. For example, when the terminal device sends the identifier of the first beam to the network device, the terminal device does not receive the response message for the identifier of the first beam, and the terminal device determines that current beams are all unavailable. In this case, the terminal device determines that a radio link fails, and sends the connection re-establishment request to the network device. Optionally, the connection re-establishment request may be a radio resource control (RRC for short) connection re-establishment request. For another example, when the terminal device sends the first request to the network device, where the first request is used to request the uplink resource, and the terminal device does not receive a response message for the first request within specified duration, and a quantity of times that the terminal device sends the first request is greater than a preset quantity of times. In this case, the terminal device determines that a radio link fails, and sends the connection re-establishment request to the network device. Optionally, the connection re-establishment request may be an RRC connection re-establishment request.

The following provides a detailed description with reference to a specific example.

In any one of the following cases a physical layer of the terminal device indicates an out-of-sync indication to an RRC layer of the terminal device:

Case 1: There is no serving beam whose reference signal received quality or strength exceeds a threshold.

Case 2: There is no serving beam whose reference signal received quality or strength exceeds a threshold, and there is no other available downlink beams.

Solution 1: When the RRC layer of the terminal device receives N consecutive out-of-sync indications from the physical layer of the terminal device, a fourth timer is started. If an in sync indication is received from the PHY layer when the fourth timer runs, the fourth timer is stopped, where N is an integer, and is configured by the network device or specified in a protocol in advance.

When the fourth timer is started, the terminal device determines that the radio link fails, and initiates RRC re-establishment.

Solution 2: When the terminal device determines that a beam failure occurs, the terminal device starts a third timer. The third timer is used by the terminal device to search for or identify an available downlink beam. If there is no available serving beam and no other new available beams are found when the third timer expires, the terminal device determines that the radio link fails, and initiates an RRC re-establishment process. If determining that there is at least one available serving beam when the third timer expires, the terminal device sends the identifier of the first beam to the network device. For details, refer to the descriptions in step 201 to step 204. It should be noted that "available" may be understood as that reference signal received quality or strength of a beam is greater than or equal to a threshold.

Optionally, after sending the identifier of the first beam to the network device, the terminal device does not receive, within the preset time, the response message for the identifier of the first beam that is sent by the network device or the response message for the beam report that is sent by the network device. In this case, the terminal device determines that the radio link fails, and initiates RRC re-establishment. Specifically, the physical layer or the MAC layer of the terminal device sends a beam failure indication to the RRC layer of the terminal device. The RRC layer of the terminal device determines that the radio link fails, and initiates RRC re-establishment.

Optionally, when the terminal device sends the first request to the network device for M times, and does not receive the response message for the first request that is sent by the network device or the response message for the identifier of the first beam that is sent by the network device, the terminal device determines that the radio link fails, and initiates an RRC re-establishment process, where M is an integer, and is configured by the network device or specified in a protocol in advance. Specifically, the physical layer or the MAC layer of the terminal device sends a beam failure indication to the RRC layer of the terminal device. The RRC layer of the terminal device determines that the radio link fails, and initiates RRC re-establishment.

Optionally, duration of the third timer and duration of the fourth timer may be specified in a protocol in advance, or may be preconfigured by the network device.

In this application, that a terminal device measures a beam of a network device in step 201 may be optionally implemented in the following manner:

Optionally, the terminal device further receives a first configuration sent by the network device, and the first configuration includes a period of window and duration of window. That a terminal device measures a beam of a network device includes: measuring, by the terminal device, the beam of the network device based on the period of window and the duration of window. According to the measurement method, the terminal device can be prevented from continually performing beam measurement, so as to reduce power consumption of the terminal device, and save power.

Figure 4:
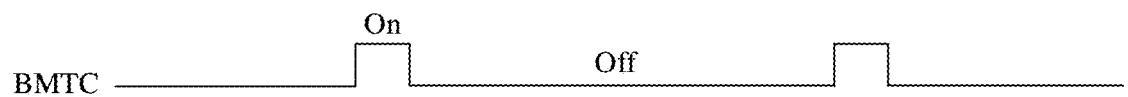
FIG. 4 is a schematic diagram of a period of window and duration of window for beam measurement according to this application.

Specifically, FIG. 4 is a schematic diagram of a period of window and duration of window for beam measurement. The terminal device periodically performs beam measurement in the duration of window based on the first configuration, to determine whether a beam failure occurs. For example, as shown in FIG. 4, beam measurement may be performed during beam management timing configuration (BMTC for short) ON duration, and beam measurement may be performed based on the SS-block or the CSI-RS.

Figure 5:
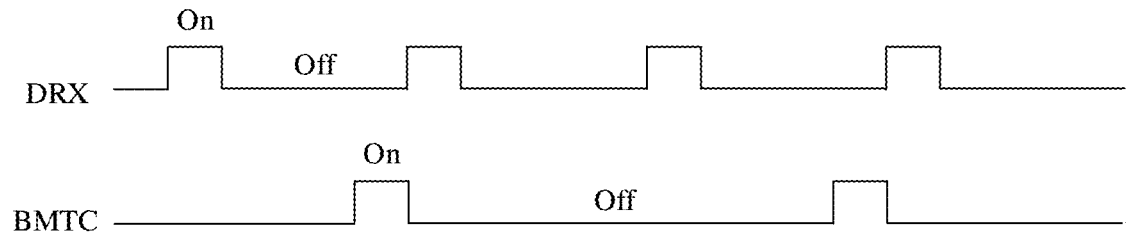
FIG. 5 is a schematic diagram of beam measurement duration according to this application.

Optionally, if discontinuous reception (DRX for short) is further configured for the terminal device, the terminal device may further perform beam measurement during discontinuous reception activation duration (for example, DRX ON), to determine whether a beam failure occurs. When configuring the BMTC, the network device needs to consider the DRX ON duration. For example, referring to FIG. 5, the BMTC ON duration may be configured before the DRX ON duration, so that the terminal device can determine, during the DRX ON duration, whether there is an available downlink beam for receiving the downlink control signaling (the downlink assignment or the uplink grant). If there is no available downlink beam for receiving the downlink control signaling, the terminal device sends the identifier of the first beam to the network device, and initiates a beam recovery process; otherwise, the terminal device does not initiate a beam recovery process.

The DRX active duration is used to control the terminal device to listen to the PDCCH, to obtain the downlink control signaling. Optionally, the terminal device listens to PDCCHs of all active cells.

In a case in which the DRX is configured for the terminal device, optionally, when the terminal device is in a trigger state of a scheduling request, the terminal device determines, within preset duration, whether there is an available downlink serving beam. If there is an available downlink serving beam, the terminal device sends the scheduling request to the network device, and listens to the PDCCH, to obtain a possible UL grant; or if there is no available downlink serving beam, the terminal device does not send the scheduling request to the network device, and triggers a beam recovery process. The scheduling request is used by the terminal device to request an uplink transmission resource from the network device. In this manner, when determining that there is no available beam, the terminal device does not send the scheduling request, so as to save power of the terminal device.

In another implementation, this application further provides another beam management method. The method specifically includes the following steps.

Step A: A terminal device measures a beam of a network device.

Optionally, the terminal device may periodically measure the beam of the network device, or measure the beam of the network device according to an indication of the network device. Optionally, the terminal device may obtain, through measurement, a beam on which a beam failure occurs. The beam on which the beam failure occurs may be a beam whose reference signal received strength RSRP or reference signal received quality RSRQ is less than a first threshold, or a beam whose reference signal received strength RSRP or reference signal received quality RSRQ is always less than a first threshold within a preset time. Alternatively, the beam on which the beam failure occurs may be understood as a beam whose reference signal received strength or reference signal received quality is relatively low. Optionally, the terminal device may further obtain, through measurement, a beam meeting a first condition. The beam meeting the first condition may be a beam whose reference signal received strength or reference signal received quality is greater than a second threshold. Alternatively, the beam meeting the first condition may be understood as N beams whose reference signal received strength or reference signal received quality is relatively high, where N is greater than or equal to 1.

Step B: When the terminal device is in a first state (the first state is also referred to as a trigger state of a beam recovery report), the terminal device determines whether there is an uplink resource.

The uplink resource may include some or all of the following content: a transport block size, a physical time-frequency resource block (for example, a quantity), information used to indicate new transmission or retransmission, a modulation and coding scheme, a HARQ process ID, and a redundancy version. The uplink resource may be a dynamically scheduled uplink resource, or may be a semi-statically scheduled uplink resource, or may be a contention-based uplink resource (an uplink resource shared by a plurality of terminals, for example, a grant-free resource). Optionally, the uplink resource may be used to indicate an uplink resource of a primary cell or a secondary cell. Optionally, the uplink resource is an uplink transmission resource used to report the beam recovery report.

Step C: If determining that there is an uplink resource, the terminal device generates the beam recovery report based on the uplink resource.

The beam recovery report includes an identifier of a first beam, and the first beam is a beam on which a beam failure occurs or a beam meeting the first condition.

The beam recovery report is used to notify the network device of at least one downlink serving beam on which a beam failure occurs. Optionally, the beam recovery report may be further used to notify the network device of a downlink beam whose reference signal received strength or quality is relatively high. The network device may delete, from a downlink serving beam set based on the beam recovery report, the at least one downlink serving beam on which the beam failure occurs, and add the downlink beam whose reference signal received strength or quality is relatively high to the downlink serving beam set.

Optionally, the beam recovery report may be sent by using physical layer control signaling or MAC layer control signaling.

Step D: The terminal device sends the beam recovery report to the network device based on the uplink resource.

The network device determines, based on the beam recovery report, a downlink beam that may be used to transmit data to the terminal device, for example, determines whether to send downlink control signaling by using the downlink beam. If the network device determines that the at least one downlink serving beam is not used to send the downlink control signaling, and/or send the at least one downlink serving beam may be used to send the downlink control signaling, the network device generates a response message for the beam recovery report. The terminal device adjusts, based on the response message for the beam recovery report, settings of a receive beam, to effectively obtain the downlink control signaling.

In step B, if the terminal device determines that there is no available uplink resource, before step C, the method further includes the following step:

Step E: The terminal device sends a beam recovery request to the network device.

Optionally, the beam recovery request may be uplink control signaling or a random access preamble.

Optionally, before sending the beam recovery request, the terminal device enters a second state (which may also be referred to as a trigger state of the beam recovery request). The trigger state of the beam recovery request is used to trigger sending of the beam recovery request.

Optionally, the beam recovery request may be a random access preamble sequence, and is sent through a physical random access channel.

Optionally, the beam recovery request may alternatively be uplink control signaling, and is sent through a physical uplink control channel.

In a possible implementation, when one or more of the following conditions are met, the terminal device is triggered to enter the first state (the trigger state of the beam recovery report).

Condition 1: A fifth timer expires.

The fifth timer is used to periodically trigger the terminal device to enter the first state.

Condition 2: A sixth timer expires.

The sixth timer is used to trigger the terminal device to enter the first state again when the terminal device does not receive the response message for the beam recovery report.

Condition 3: The terminal device determines that a beam failure occurs.

Optionally, if reference signal received strength or reference signal received quality of a serving beam of the terminal device is less than the first threshold within preset duration, the terminal device determines that a beam failure occurs. Optionally, a reference signal of the serving beam may be a reference signal of a control channel and/or a data channel. Optionally, if M serving beams are configured for the terminal device, and reference signal received strength or reference signal received quality of N DL beams is less than a preset threshold within preset duration, the terminal device determines that a beam failure occurs, where M is greater than N, and M and N are integers and may be both set by a network. The reference signal may be at least one of a synchronization signal (PSS/SSS), a CSI-RS, a cell reference signal (CRS for short), a BRS, and a demodulation reference signal (DMRS for short).

In a possible implementation, when one or more of the following conditions are met, the terminal device is triggered to cancel the first state (the trigger state of the beam recovery report).

Condition 1: The first state is cancelled after the beam recovery report is generated based on the uplink resource.

In other words, the first state is canceled after the beam recovery report is generated.

Condition 2: The first state is cancelled after the terminal device generates the beam recovery report based on the uplink resource, sends the beam recovery report to the network device, and receives the response message for the beam recovery report that is sent by the network device.

In other words, the first state is cancelled after the response message for the beam recovery report is received.

Condition 3: The first state is cancelled after the beam recovery report is sent to the network device based on the uplink resource.

In other words, the first state is canceled after the beam recovery report is sent.

Condition 4: The first state is cancelled when a generated MAC PDU (protocol data unit) includes the beam recovery report (or includes the identifier of the first beam).

In a possible implementation, when one or more of the following conditions are met, the terminal device is triggered to enter the second state (the trigger state of the beam recovery request).

Condition 1: When the terminal device enters the first state and determines that there is no available uplink resource, the terminal device enters the second state.

In a possible implementation, when one or more of the following conditions are met, the terminal device is triggered to cancel the second state (the trigger state of the beam recovery request).

Condition 1: The second state is cancelled after the beam recovery report is generated based on the uplink resource.

In other words, the second state is canceled after the beam recovery report is generated.

Condition 2: The second state is cancelled after the terminal device generates the beam recovery report based on the uplink resource, sends the beam recovery report to the network device, and receives the response message for the beam recovery report that is sent by the network device.

In other words, the second state is cancelled after the response message for the beam recovery report is received.

Condition 3: The second state is cancelled after the beam recovery report is sent to the network device based on the uplink resource.

In other words, the second state is canceled after the beam recovery report is sent.

Condition 4: The second state is cancelled when a generated MAC PDU includes the beam recovery report (or includes the identifier of the first beam).

Based on the foregoing implementation methods for triggering the first state/the second state and canceling the first state/the second state, the terminal device may determine, based on a current state, whether to send the beam recovery report/the beam recovery request to the network device.

For a specific implementation method for sending the beam recovery request by the terminal device, refer to the method for sending the first request by the terminal device in the foregoing embodiment of this application. Details are not described herein again.

For a method for measuring a beam by the terminal device, refer to the method for measuring the beam by the terminal device in the foregoing embodiment of this application. Details are not described herein again. In the foregoing embodiments of this application, the beam management method provided in the embodiments of this application is described separately from perspectives of network elements and interaction between the network elements. It may be understood that, to implement the foregoing functions, the network elements such as the terminal device (for example, UE) and the network device (for example, s base station) include corresponding hardware structures and/or software modules for implementing the functions. A person skilled in the art should easily be aware that units and algorithm steps in the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
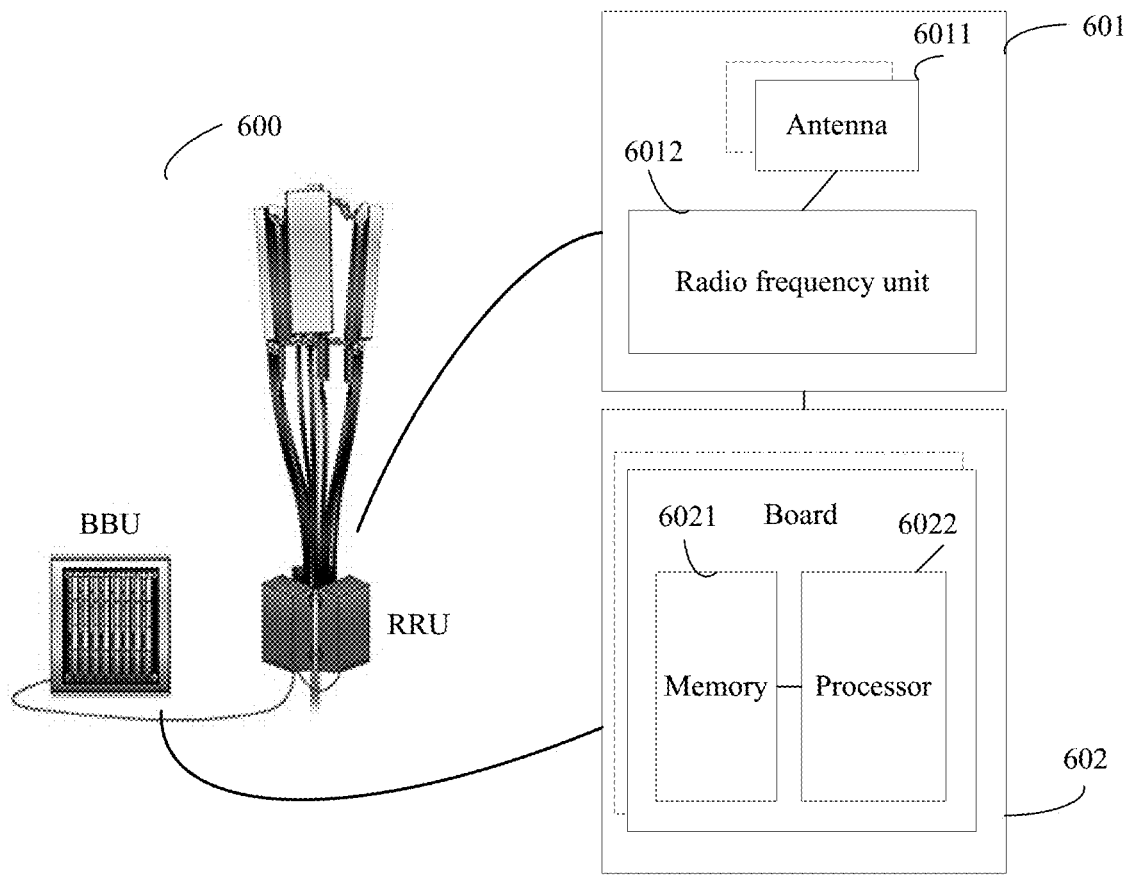
FIG. 6 is a network device according to this application.

Based on a same inventive concept, an embodiment of this application further provides a network device 600. As shown in FIG. 6, the network device 600 may be configured to perform the method performed by the network device in any one of the foregoing embodiments. The network device 600 includes one or more remote radio units (RRU for short) 601 and one or more baseband units (BBU for short) 602. The RRU 601 may be referred to as a transceiver unit, a transceiver, a transceiver circuit, a transceiver, or the like, and the RRU 601 may include at least one antenna 6011 and at least one radio frequency unit 6012. The RRU 601 is mainly configured to: receive and send a radio frequency signal, and perform conversion between the radio frequency signal and a baseband signal. The BBU 602 is mainly configured to: perform baseband processing, control the network device, and the like. The RRU 601 and the BBU 602 may be physically disposed together, or may be physically disposed separately, namely, a distributed network device.

The BBU 602 is a control center of the network device, may also be referred to as a processing unit, and is mainly configured to complete baseband processing functions such as channel coding, multiplexing, modulation, and spectrum spreading. For example, the BBU (the processing unit) may be configured to control the network device to perform the method performed by the network device in any of the foregoing embodiments.

For example, the BBU 602 may include one or more boards. A plurality of boards may jointly support a radio access network (such as an LTE network) of a single access standard, or may separately support radio access networks of different access standards. The BBU 602 further includes a memory 6021 and a processor 6022. The memory 6021 is configured to store necessary instructions and data. The processor 6022 is configured to control the network device to perform a necessary action, for example, is configured to control the network device to perform the method performed by the network device in any one of the foregoing embodiments. The memory 6021 and the processor 6022 may serve one or more boards. In other words, a memory and a processor may be disposed on each board. Alternatively, a plurality of boards may share a same memory and processor. In addition, a necessary circuit is further disposed on each board.

In an uplink, an uplink signal (including data and the like) sent by a terminal device is received by using the antenna 6011. In a downlink, a downlink signal (including data and/or control information) is sent to the terminal device by using the antenna 6011. In the processor 6022, service data and a signaling message are processed. These units perform processing based on a radio access technology used in a radio access network (for example, an access technology in LTE, NR, and another evolved system). The processor 6022 is further configured to control and manage an action of the network device, and is configured to perform processing performed by the network device in the foregoing embodiments. The processor 6022 is further configured to support the network device in performing a related process performed by the network device in FIG. 2.

It may be understood that FIG. 6 shows only a simplified design of the network device. In actual application, the network device may include any quantity of antennas, memories, processors, radio frequency units, RRUs, BBUs, and the like, and all network devices that can implement this application fall within the protection scope of this application.

Specifically, in this application, for example, an example in which the RRU 601 is referred to as a transceiver is used, and the transceiver and the processor in the network device 600 may be specifically configured to perform the following operations:

The transceiver is configured to receive physical layer control signaling or MAC layer control signaling sent by a terminal device. The physical layer control signaling or the MAC layer control signaling includes an identifier of a first beam, and the first beam is a beam on which a beam failure occurs or a beam meeting a first condition.

The transceiver is further configured to send a response message for the identifier of the first beam to the terminal device. The response message is used to indicate an identifier of a beam serving the terminal device.

Optionally, the physical layer control signaling or the MAC layer control signaling is sent by the terminal device to the network device when the terminal device determines that the beam failure occurs; or the physical layer control signaling or the MAC layer control signaling is sent by the terminal device to the network device when the terminal device determines that a first timer expires; or the physical layer control signaling or the MAC layer control signaling is sent by the terminal device to the network device when the terminal device determines that a second timer expires and a response to an identifier of a second beam is not received, where the second beam is a beam on which a beam failure occurs or a beam meeting the first condition.

Optionally, the transceiver is further configured to: receive a first request sent by the terminal device, where the first request is used to request an uplink resource; and send, to the terminal device, second indication information used to indicate an uplink resource, where the uplink resource is used to transmit the physical layer control signaling or the MAC layer control signaling.

Optionally, a sending priority of the MAC layer control signaling is higher than a sending priority of a buffer status report.

Optionally, the sending priority of the MAC layer control signaling is lower than a sending priority of control signaling of an identifier of the terminal device.

Optionally, the first request is a random access preamble sequence, and is sent by the terminal device to the network device through a physical random access channel; or the first request is uplink control signaling, and is sent by the terminal device to the network device through a physical uplink control channel.

Optionally, the transceiver is configured to receive a connection re-establishment request sent by the terminal device. The connection re-establishment request is generated by the terminal device when the terminal device cannot receive the identifier of the beam serving the terminal device.

Optionally, the transceiver is further configured to send a first configuration to the terminal device. The first configuration includes a period of window and duration of window, and the identifier of the first beam is obtained by the terminal device through measurement based on the period of window and the duration of window.

Based on a same inventive concept, an embodiment of this application further provides a terminal device 700, which is shown in FIG. 7(a). For ease of description, FIG. 7(a) shows only main components of the terminal device. As shown in FIG. 7(a), the terminal device 700 includes a processor, a memory, a control circuit, an antenna, and an input/output apparatus. The processor is mainly configured to: process a communications protocol and communication data, control the entire terminal device, execute a software program, and process data of the software program, for example, is configured to support the terminal device 700 in performing the method performed by the terminal device 700 in any one of the foregoing embodiments. The memory is mainly configured to store a software program and data. The control circuit is mainly configured to: perform conversion between a baseband signal and a radio frequency signal, and process the radio frequency signal. The control circuit and the antenna may be integrated into a transceiver that is mainly configured to receive/send a radio frequency signal in an electromagnetic wave form. The input/output apparatus such as a touchscreen, a display screen, or a keyboard is mainly configured to: receive data entered by a user, and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal in an electromagnetic wave form by using the antenna. When there is data that is to be sent to the terminal device 700, the radio frequency circuit receives a radio frequency signal by using the antenna, converts the radio frequency signal into a baseband signal, and outputs the baseband signal to the processor. The processor converts the baseband signal into data, and processes the data.

Figure 7:
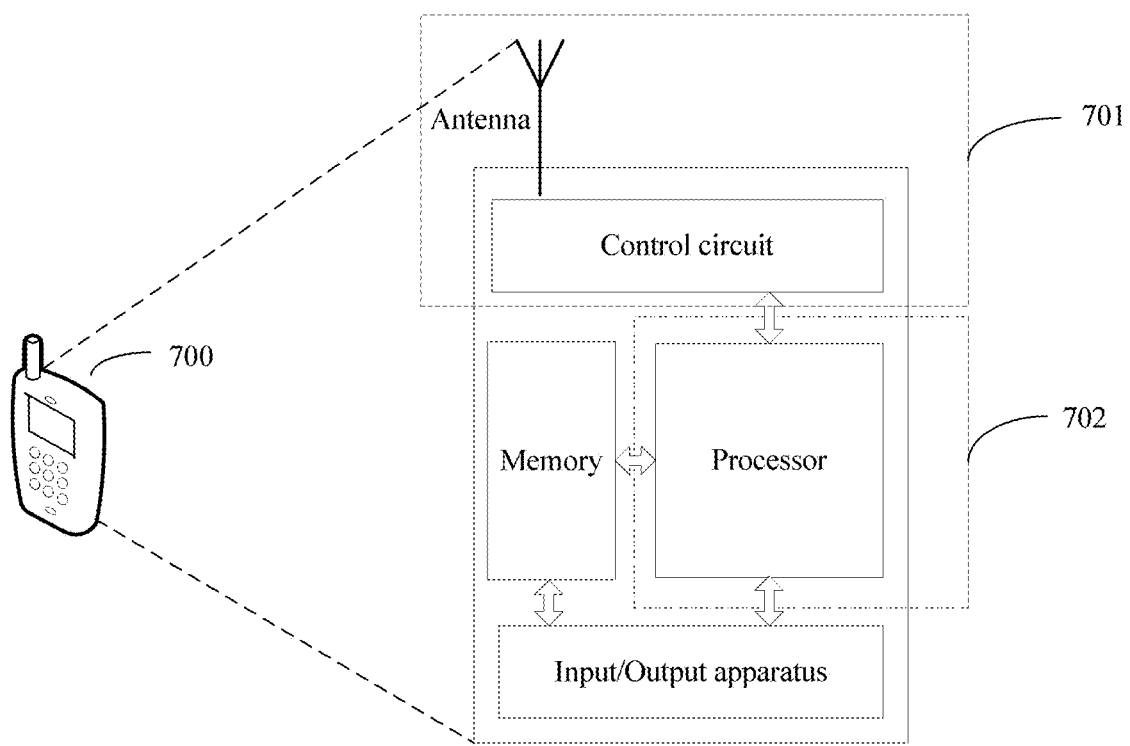
FIG. 7(a) is a terminal device according to this application.
FIG. 7(b) is a terminal device according to this application.
Figure 7:
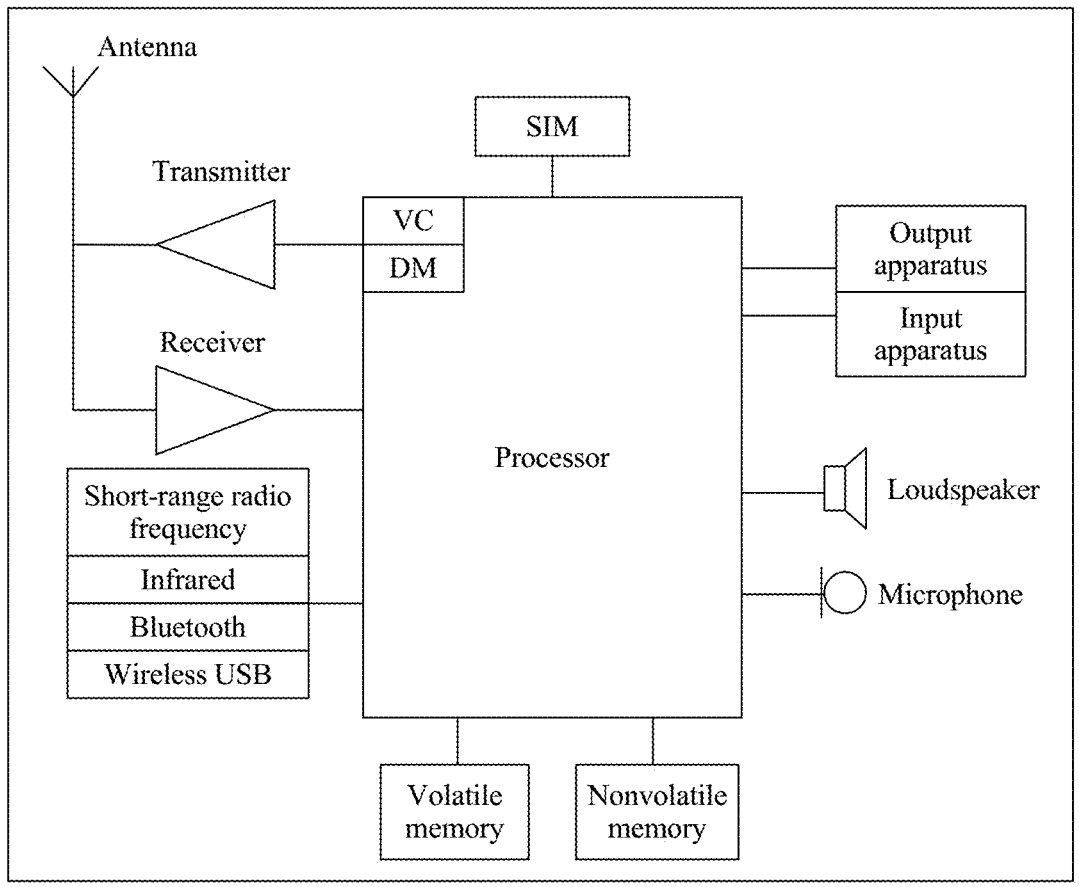

A person skilled in the art may understand that, for ease of description, FIG. 7(*a*) shows only one memory and only one processor. Actually, the terminal device may include a plurality of processors and a plurality of memories. The memory may also be referred to as a storage medium, a storage device, or the like. This is not limited in this application.

In an optional implementation, the processor may include a baseband processor and a central processing unit. The baseband processor is mainly configured to process a communications protocol and communication data, and the central processing unit is mainly configured to: control the entire terminal device 700, execute a software program, and process data of the software program. Functions of the baseband processor and the central processing unit are integrated into the processor in FIG. 7(*a*). A person skilled in the art may understand that the baseband processor and the central processing unit may be independent processors, and are interconnected by using a technology such as a bus. A person skilled in the art may understand that the terminal device may include a plurality of baseband processors to adapt to different network standards, the terminal device 700 may include a plurality of central processing units to enhance a processing capability of the terminal device 700, and the components of the terminal device 700 may be connected by using various buses. The baseband processor may also be expressed as a baseband processing circuit or a baseband processing chip. The central processing unit may also be expressed as a central processing circuit or a central processing chip. A function of processing a communications protocol and communication data may be built into the processor, or may be stored in a storage unit in a form of a software program, so that the processor executes the software program to implement a baseband processing function.

For example, in this application, the antenna and the control circuit having receiving and sending functions may be considered as a transceiver unit 701 of the terminal device 700, and the processor having a processing function may be considered as a processing unit 702 of the terminal device 700. As shown in FIG. 7(*a*), the terminal device 700 includes the transceiver unit 701 and the processing unit 702. The transceiver unit may also be referred to as a transceiver, a transceiver, a transceiver apparatus, or the like. Optionally, a component that is in the transceiver unit 701 and is configured to implement a receiving function is considered as a receiving unit, and a component that is in the transceiver unit 701 and is configured to implement a sending function is considered as a sending unit, in other words, the transceiver unit 701 includes the receiving unit and the sending unit. For example, the receiving unit may also be referred to as a receiver, a receiver, or a receiver circuit, and the sending unit may also be referred to as a transmitter, a transmitter, or a transmit circuit.

In a downlink, a downlink signal (including data and/or control information) sent by a network device is received by using the antenna. In an uplink, an uplink signal (including data and/or control information) is sent to the network device by using the antenna. In the processor, service data and a signaling message are processed. These units perform processing based on a radio access technology used in a radio access network (for example, an access technology in LTE, NR, and another evolved system). The processor is further configured to control and manage an action of the terminal device, and is configured to perform processing performed by the terminal device in the foregoing embodiments. The processor is further configured to support the terminal device in performing a related process performed by the terminal device in FIG. 2.

It may be understood that FIG. 7(*a*) shows only a simplified design of the terminal device. In actual application, the terminal device may include any quantity of antennas, memories, processors, and the like, and all terminal devices that can implement this application fall within the protection scope of this application.

Specifically, in this application, an example in which the transceiver unit is referred to as a transceiver is used, and the processing unit is referred to as a processor. In this case, the transceiver and the processor in the terminal device 700 may be specifically configured to perform the following operations:

The processor is configured to measure a beam of a network device.

The transceiver is configured to send an identifier of a first beam to the network device by using physical layer control signaling or media access control MAC layer control signaling. The first beam is a beam on which a beam failure occurs or a beam meeting a first condition.

Optionally, when the beam failure occurs, the transceiver sends the identifier of the first beam to the network device by using the physical layer control signaling or the MAC layer control signaling; or when a first timer expires, the transceiver sends the identifier of the first beam to the network device by using the physical layer control signaling or the MAC layer control signaling; or when a second timer expires and a response to an identifier of a second beam is not received, the transceiver sends the identifier of the first beam to the network device by using the physical layer control signaling or the MAC layer control signaling, where the second beam is a beam on which a beam failure occurs or a beam meeting the first condition.

Optionally, the transceiver further sends a first request to the network device, where the first request is used to request an uplink resource; and is configured to receive, from the network device, second indication information used to indicate an uplink resource, where the uplink resource is used to transmit the physical layer control signaling or the MAC layer control signaling.

Optionally, a sending priority of the MAC layer control signaling is higher than a sending priority of a buffer status report.

Optionally, the sending priority of the MAC layer control signaling is lower than a sending priority of control signaling of an identifier of the terminal device.

Optionally, the first request is a random access preamble sequence, and is sent to the network device through a physical random access channel; or the first request is uplink control signaling, and is sent to the network device through a physical uplink control channel.

Optionally, if the transceiver cannot receive an identifier of a beam serving the terminal device, the transceiver sends a connection re-establishment request to the network device.

Optionally, the transceiver receives a first configuration sent by the network device, and the first configuration includes a period of window and duration of window. The processor is specifically configured to measure the beam of the network device based on the period of window and the duration of window.

FIG. 7(b) is a schematic diagram of another terminal device according to this application. A processor may include a circuit used for an audio/video function and a logical function of the terminal device. For example, the processor may include a digital signal processor device, a microprocessor device, an analog-to-digital converter, and a digital-to-analog converter. Control and signal processing functions of mobile devices may be allocated between these devices based on their respective capabilities of these devices. The processor may further include an internal voice coder VC, an internal data modem DM, and the like. In addition, the processor may include functions for operating one or more software programs, and the software programs may be stored in a memory. The processor and the stored software instruction may be usually configured as an action performed by the terminal device. For example, the processor can operate a connection program.

The terminal device may further include a user interface. The user interface may, for example, include a headset or a loudspeaker, a microphone, an output apparatus (for example, a display), and an input apparatus. The user interface may be coupled to the processor by using an operation. In this case, the processor may include a user interface circuit, configured to control at least some functions of one or more elements (for example, the loudspeaker, the microphone, and the display) of the user interface. The processor and/or the user interface circuit included in the processor may be configured to control one or more functions of the one or more elements of the user interface by using a computer program instruction (for example, software and/or firmware) stored in a memory accessible to the processor. Although not shown, the terminal device may include a battery configured to supply power to various circuits related to the mobile device. The circuit is, for example, a circuit that provides mechanical vibration as a detectable output. The input apparatus may include a device that allows the apparatus to receive data, for example, a keypad, a touch display, a joystick, and/or at least one other input device.

The terminal device may further include one or more connection circuit modules configured to share and/or obtain data. For example, the terminal device may include a short-range radio frequency RF transceiver and/or detector, to share data with an electronic device and/or obtain data from an electronic device based on an RF technology. The terminal device may include other short-range transceivers such as an infrared IR transceiver, a used transceiver, and a wireless universal serial bus USB transceiver. The Bluetooth transceiver can operate based on a low-power or ultra-low-power Bluetooth technology. In this case, more specifically, the terminal device is the short-range transceiver, and can send data to and/or receive data from an electronic device near the apparatus (for example, within 10 meters). Although not shown, the terminal device can send data to and/or receive data from the electronic device based on various wireless networking technologies, and these technologies include: Wi-Fi, Wi-Fi low power consumption, and WLAN technologies such as an IEEE 802.11 technology, an IEEE 802.15 technology, and an IEEE 802.16 technology.

The terminal device may include a memory that can store an information element related to a mobile user, for example, a subscriber identity module SIM. In addition to the SIM, the apparatus may further include another removable and/or fixed memory. The terminal device may include a volatile memory and/or a nonvolatile memory. For example, the volatile memory may include a random access memory RAM, and the RAM includes a dynamic RAM and/or a static RAM, and an on-chip and/or off-chip cache. The nonvolatile memory may be embedded and/or removable. The nonvolatile memory may include, for example, a read-only memory, a flash memory, a magnetic storage device such as a hard disk, a floppy disk drive, or a magnetic tape, an optical disc drive and/or a medium, and a nonvolatile random access memory NVRAM. Similar to the volatile memory, the nonvolatile memory may include a cache area used for temporary storage of data. At least a part of the volatile memory and/or the nonvolatile memory may be embedded into the processor. The memory may store one or more software programs, instructions, information blocks, data, and the like. The memory may be used by the terminal device to perform a function of the terminal device. For example, the memory may include an identifier that can uniquely identify the terminal device, for example, an international mobile equipment identity IMEI code.

Figure 8:
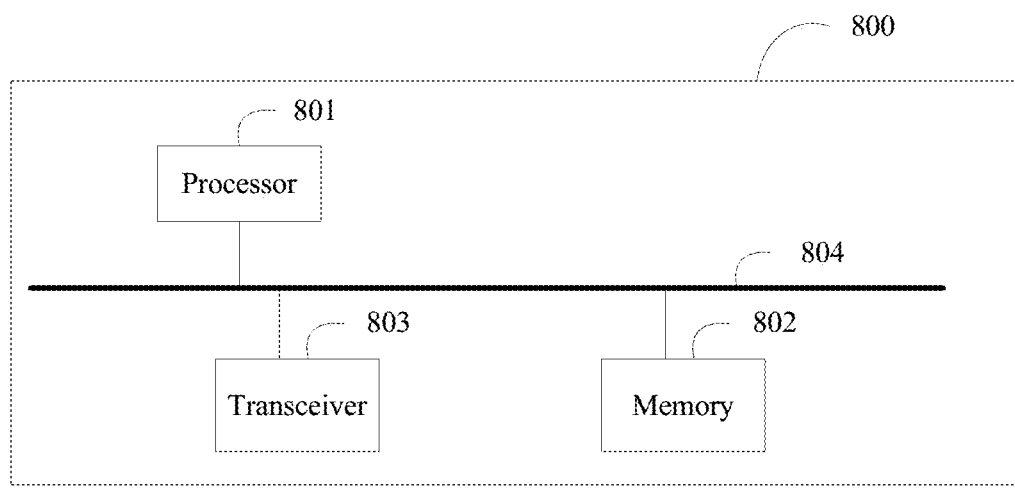
FIG. 8 is an apparatus according to this application.

Based on a same inventive concept, an embodiment of this application further provides an apparatus 800. The apparatus 800 may be a network device, or may be a terminal device. As shown in FIG. 8, the apparatus 800 includes at least a processor 801 and a memory 802, may further include a transceiver 803, and may further include a bus 804.

The processor 801, the memory 802, and the transceiver 803 are connected by using the bus 804.

The memory 802 is configured to store a computer executable instruction.

The processor 801 is configured to execute the computer executable instruction stored in the memory 802.

When the apparatus 800 is the network device, the processor 801 executes the computer executable instruction stored in the memory 802, so that the apparatus 800 is enabled to perform the steps performed by the network device in any one of the foregoing embodiments of this application, or the network device is enabled to deploy functional units corresponding to the steps.

When the apparatus 800 is the terminal device, the processor 801 executes the computer executable instruction stored in the memory 802, so that the apparatus 800 is enabled to perform the steps performed by the terminal device in any one of the foregoing embodiments of this application, or the terminal device is enabled to deploy functional units corresponding to the steps.

The processor 801 may include processors 801 of different types, or may include processors 801 of a same type. The processor 801 may be any one of the following components having a computing and processing capability: a central processing unit (CPU for short), an ARM processor (Advanced RISC Machines), a field programmable gate array (FPGA for short), and a dedicated processor. In an optional implementation, the processor 801 may be integrated as a many-core processor.

The memory 802 may be any one or any combination of the following storage media: a random access memory (RAM for short), a read-only memory (ROM for short), a nonvolatile memory (NVM for short), a solid state drive (SSD for short), a mechanical hard disk, a magnetic disk, and a disk array.

The transceiver 803 is used by the apparatus 800 to exchange data with another device. For example, if the apparatus 800 is the network device, the network device may execute the method performed by the network device in any one of the foregoing embodiments. The network device exchanges data with the terminal device by using the transceiver 803. If the apparatus 800 is the terminal device, the terminal may perform the method performed by the terminal device in any one of the foregoing embodiments. The terminal device exchanges data with the network device by using the transceiver 803. The transceiver 803 may be any one or any combination of the following components having a network access function: a network interface (for example, an Ethernet interface) and a wireless network interface card.

The bus 804 may include an address bus, a data bus, a control bus, and the like. For ease of denotation, the bus is represented by using a thick line in FIG. 8. The bus 804 may be any one or any combination of the following components used for wired data transmission, such as an industry standard architecture (ISA for short) bus, a peripheral component interconnect (PCI for short) bus, and an extended industry standard architecture (EISA for short) bus.

An embodiment of this application provides a computer-readable storage medium. The computer-readable storage medium stores a computer executable instruction. A processor of a terminal device executes the computer executable instruction, so that the terminal device is enabled to perform the steps performed by the terminal device in the beam management method provided in this application, or the terminal device is enabled to deploy functional units corresponding to the steps.

An embodiment of this application provides a computer-readable storage medium. The computer-readable storage medium stores a computer executable instruction. A processor of a network device executes the computer executable instruction, so that the network device is enabled to perform the steps performed by the network device in the beam management method provided in this application, or the network device is enabled to deploy functional units corresponding to the steps.

An embodiment of this application provides a computer program product. The computer program product includes a computer executable instruction, and the computer executable instruction is stored in a computer-readable storage medium. A processor of a terminal device may read the computer executable instruction from the computer-readable storage medium. The processor executes the computer executable instruction, so that the terminal device is enabled to perform the steps performed by the terminal device in the foregoing methods provided in the embodiments of this application, or the terminal device is enabled to deploy functional units corresponding to the steps.

An embodiment of this application provides a computer program product. The computer program product includes a computer executable instruction, and the computer executable instruction is stored in a computer-readable storage medium. A processor of a network device may read the computer executable instruction from the computer-readable storage medium. The processor executes the computer executable instruction, so that the network device is enabled to perform the steps performed by the network device in the foregoing methods provided in the embodiments of this application, or the network device is enabled to deploy functional units corresponding to the steps.

This application further provides a chip system. The chip system includes a processor, configured to support a terminal device in implementing functions in the foregoing aspects, for example, generating, receiving, or processing data and/or information in the foregoing methods. In a possible design, the chip system further includes a memory. The memory may be configured to store a program instruction and data that are necessary for the terminal device. The chip system may include a chip, or may include a chip and another discrete device.

This application further provides a chip system. The chip system includes a processor, configured to support a network device in implementing functions in the foregoing aspects, for example, generating, receiving, or processing data and/or information in the foregoing methods. In a possible design, the chip system further includes a memory. The memory is configured to store a program instruction and data that are necessary for the network device. The chip system may include a chip, or may include a chip and another discrete device.

Figure 9:
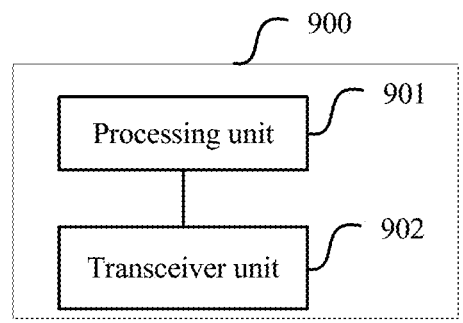
FIG. 9 is a terminal device according to this application.

Based on a same inventive concept, this application further provides a terminal device 900. As shown in FIG. 9, the terminal device 900 includes a processing unit 901 and a transceiver unit 902, to perform the method performed by the terminal device in any one of the foregoing embodiments. Optionally, the processing unit 901 and the transceiver unit 902 are configured to perform the following operations:

The processing unit 901 is configured to measure a beam of a network device.

The 902 is configured to send an identifier of a first beam to the network device by using physical layer control signaling or media access control MAC layer control signaling. The first beam is a beam on which a beam failure occurs or a beam meeting a first condition.

Optionally, when the beam failure occurs, the 902 sends the identifier of the first beam to the network device by using the physical layer control signaling or the MAC layer control signaling; or when a first timer expires, the 902 sends the identifier of the first beam to the network device by using the physical layer control signaling or the MAC layer control signaling; or when a second timer expires and a response to an identifier of a second beam is not received, the 902 sends the identifier of the first beam to the network device by using the physical layer control signaling or the MAC layer control signaling, where the second beam is a beam on which a beam failure occurs or a beam meeting the first condition.

Optionally, the 902 further sends a first request to the network device, where the first request is used to request an uplink resource; and is configured to receive, from the network device, second indication information used to indicate an uplink resource, where the uplink resource is used to transmit the physical layer control signaling or the MAC layer control signaling.

Optionally, a sending priority of the MAC layer control signaling is higher than a sending priority of a buffer status report.

Optionally, the sending priority of the MAC layer control signaling is lower than a sending priority of control signaling of an identifier of the terminal device.

Optionally, the first request is a random access preamble sequence, and is sent to the network device through a physical random access channel; or the first request is uplink control signaling, and is sent to the network device through a physical uplink control channel.

Optionally, if the 902 cannot receive an identifier of a beam serving the terminal device, the 902 sends a connection re-establishment request to the network device.

Optionally, the 902 receives a first configuration sent by the network device, and the first configuration includes a period of window and duration of window. The processing unit 901 is specifically configured to measure the beam of the network device based on the period of window and the duration of window.

Figure 10:
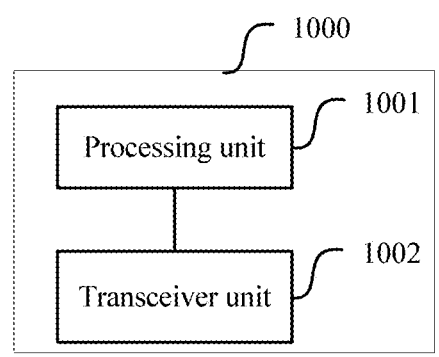
FIG. 10 is a network device according to this application.

Based on a same inventive concept, this application further provides a network device 1000. As shown in FIG. 10, the network device woo includes a processing unit 1001 and a transceiver unit 1002, to perform the method performed by the network device in any one of the foregoing embodiments. Optionally, the processing unit 1001 and the transceiver unit 1002 are configured to perform the following operations:

The transceiver unit 1002 is configured to receive physical layer control signaling or MAC layer control signaling sent by a terminal device. The physical layer control signaling or the MAC layer control signaling includes an identifier of a first beam, and the first beam is a beam on which a beam failure occurs or a beam meeting a first condition.

The transceiver unit 1002 is further configured to send a response message for the identifier of the first beam to the terminal device. The response message is used to indicate an identifier of a beam serving the terminal device.

Optionally, the physical layer control signaling or the MAC layer control signaling is sent by the terminal device to the network device when the terminal device determines that the beam failure occurs; or the physical layer control signaling or the MAC layer control signaling is sent by the terminal device to the network device when the terminal device determines that a first timer expires; or the physical layer control signaling or the MAC layer control signaling is sent by the terminal device to the network device when the terminal device determines that a second timer expires and a response to an identifier of a second beam is not received, where the second beam is a beam on which a beam failure occurs or a beam meeting the first condition.

Optionally, the transceiver unit 1002 is further configured to: receive a first request sent by the terminal device, where the first request is used to request an uplink resource; and send, to the terminal device, second indication information used to indicate an uplink resource, where the uplink resource is used to transmit the physical layer control signaling or the MAC layer control signaling.

Optionally, a sending priority of the MAC layer control signaling is higher than a sending priority of a buffer status report.

Optionally, the sending priority of the MAC layer control signaling is lower than a sending priority of control signaling of an identifier of the terminal device.

Optionally, the first request is a random access preamble sequence, and is sent by the terminal device to the network device through a physical random access channel; or the first request is uplink control signaling, and is sent by the terminal device to the network device through a physical uplink control channel.

Optionally, the transceiver unit 1002 is configured to receive a connection re-establishment request sent by the terminal device. The connection re-establishment request is generated by the terminal device when the terminal device cannot receive the identifier of the beam serving the terminal device.

Optionally, the transceiver unit 1002 is further configured to send a first configuration to the terminal device. The first configuration includes a period of window and duration of window, and the identifier of the first beam is obtained by the terminal device through measurement based on the period of window and the duration of window.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When a computer program instruction is loaded and executed on a computer, the procedure or functions according to this application are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD for short)), or the like.

A person skilled in the art may further understand that various illustrative logical blocks (illustrative logical block) and steps (step) that are listed in this application may be implemented by using electronic hardware, computer software, or a combination thereof. Whether the functions are implemented by using hardware or software depends on particular applications and a design requirement of the entire system. A person skilled in the art may use various methods to implement the functions for each particular application, but it should not be considered that the implementation goes beyond the scope of this application.

Various illustrative logical units and circuits described in this application may implement or operate the described functions by using a general-purpose processor, a digital signal processor, an application-specific integrated circuit (ASIC for short), a field programmable gate array (FPGA for short) or another programmable logic apparatus, a discrete gate or transistor logic, a discrete hardware component, or a design of any combination of the foregoing. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in this application may be directly embedded into hardware, a software unit executed by a processor, or a combination thereof. The software unit may be stored in a random access memory (RAM for short), a flash memory, a read-only memory (ROM for short), an erasable programmable read only memory (EPROM for short), a register, a hard disk, a removable disk, a compact disc read-only memory (CD-ROM for short), or any other form of storage medium in the art. For example, the storage medium may connect to a processor so that the processor may read information from the storage medium and write information to the storage medium. Alternatively, the storage medium may further be integrated into a processor. The processor and the storage medium may be disposed in an ASIC, and the ASIC may be disposed in a terminal device or a network device. Optionally, the processor and the storage medium may be disposed in different components of the terminal device or the network device.

In one or more examples of designs, the functions described in this application may be implemented by using hardware, software, firmware, or any combination thereof. If this application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a digital versatile disc (DVD for short), a floppy disk, and a Blu-ray disc. The disk generally copies data by a magnetic means, and the disc generally copies data optically by a laser means. The foregoing combination may also be included in the computer-readable medium.

A person skilled in the art should be aware that in the foregoing one or more examples, functions described in this application may be implemented by hardware, software, firmware, or any combination thereof. When embodiments of the present invention is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A method comprising:
   measuring, by an apparatus, a beam of a network device; and
   in response to measuring the beam of the network device, sending, by the apparatus, an identifier of a first beam to the network device using media access control (MAC) layer control signaling, wherein the first beam is
   a beam meeting a first condition, the first condition being met when reference signal received power (RSRP) or reference signal received quality (RSRQ) of the beam is above a threshold, and a sending priority of the MAC layer control signaling being higher than a sending priority of a buffer status report; and
   wherein the method further comprises:
   sending, by the apparatus when there is no available uplink resource, a first request to the network device, wherein the first request requests an uplink resource; and
   receiving, by the apparatus from the network device, second indication information indicating a first uplink resource, wherein the MAC layer control signaling is transmitted on the first uplink resource.

2. The method according to claim 1, wherein sending, by the apparatus, the identifier of the first beam to the network device using the MAC layer control signaling comprises:
   when beam failure occurs, sending, by the apparatus, the identifier of the first beam to the network device using the MAC layer control signaling;
   when a first timer expires, sending, by the apparatus, the identifier of the first beam to the network device using the MAC layer control signaling; or
   when a second timer expires and a response to an identifier of a second beam is not received, sending, by the apparatus, the identifier of the first beam to the network device using the MAC layer control signaling, wherein the second beam is:
   a beam on which a beam failure occurs; or
   a beam meeting the first condition.

3. The method according to claim 1, wherein the sending priority of the MAC layer control signaling is lower than a sending priority of control signaling of an identifier of the apparatus.

4. The method according to claim 1, wherein the method further comprises:
   when an identifier of a beam serving the apparatus cannot be received, sending, by the apparatus, a connection re-establishment request to the network device.

5. The method of claim 1, further comprising:
   receiving, by the apparatus, a response message for the identifier of the first beam from the network device, wherein the response message is associated with a beam serving the apparatus.

6. A method comprising:
receiving, by an apparatus, media access control (MAC) layer control signaling from a terminal device, wherein the MAC layer control signaling comprises an identifier of a first beam, and the first beam is
a beam meeting a first condition, the first condition being met when reference signal received power (RSRP) or reference signal received quality (RSRQ) of the beam is above a threshold, and a sending priority of the MAC layer control signaling being higher than a sending priority of a buffer status report; and
sending, by the apparatus to the terminal device, a response message corresponding to the identifier of the first beam, wherein the response message is associated with a beam serving the terminal device; and
wherein the method further comprises:
receiving, by the apparatus, a first request from the terminal device, wherein the first request requests an uplink resource; and
sending, by the apparatus to the terminal device, second indication information indicating a first uplink resource, wherein the MAC layer control signaling is transmitted on the first uplink resource.

7. The method according to claim 6, wherein: the MAC layer control signaling is received when:
beam failure occurs;
a first timer expires; or
a second timer expires and a response to an identifier of a second beam is not received, wherein the second beam is:
a beam on which a beam failure occurs; or
a beam meeting the first condition.

8. The method according to claim 6, wherein the sending priority of the MAC layer control signaling is lower than a sending priority of control signaling of an identifier of the terminal device.

9. The method according to claim 6, wherein the method further comprises:
receiving, by the apparatus, a connection re-establishment request from the terminal device, wherein the connection re-establishment request is generated by the terminal device when the terminal device cannot receive the identifier of the beam serving the terminal device.

10. An apparatus, comprising:
a processor; and
non-transitory computer-readable storage medium storing a program to be executed by the processor, the program including instructions for:
measuring a beam of a network device; and
in response to measuring the beam of the network device, sending an identifier of a first beam to the network device using media access control (MAC) layer control signaling, wherein the first beam is
a beam meeting a first condition, the first condition being met when reference signal received power (RSRP) or reference signal received quality (RSRQ) of the beam is above a threshold, and a sending priority of the MAC layer control signaling being higher than a sending priority of a buffer status report; and
wherein the instructions include further instructions for:
sending, when there is no available uplink resource, a first request to the network device, wherein the first request requests an uplink resource; and receiving from the network device, second indication information indicating a first uplink resource, wherein the MAC layer control signaling is transmitted on the first uplink resource.

11. The apparatus according to claim 10, wherein the instructions comprise instructions for:
when beam failure occurs, sending the identifier of the first beam to the network device using the MAC layer control signaling;
when a first timer expires, sending the identifier of the first beam to the network device using the MAC layer control signaling; or
when a second timer expires and a response to an identifier of a second beam is not received, sending the identifier of the first beam to the network device using the MAC layer control signaling, wherein the second beam is:
a beam on which a beam failure occurs; or
a beam meeting the first condition.

12. The apparatus according to claim 10, wherein:
the first request is a random access preamble sequence, and the first request is sent to the network device through a physical random access channel; or
the first request is uplink control signaling, and the first request is sent to the network device through a physical uplink control channel.

13. The apparatus according to claim 10, wherein the sending priority of the MAC layer control signaling is lower than a sending priority of control signaling of an identifier of the apparatus.

14. The apparatus according to claim 10, the instructions comprise further instructions for:
when an identifier of a beam serving the apparatus cannot be received, sending a connection re-establishment request to the network device.

15. The apparatus according to claim 10, wherein the apparatus is a terminal device.

16. The apparatus of claim 10, wherein the instructions further comprise instructions for:
receiving a response message for the identifier of the first beam from the network device, wherein the response message is associated with a beam serving the apparatus.

17. An apparatus comprising:
a processor; and
non-transitory computer-readable storage medium storing a program to be executed by the processor, the program including instructions for:
receiving media access control (MAC) layer control signaling from a terminal device, wherein the MAC layer control signaling comprises an identifier of a first beam, and the first beam is a beam meeting a first condition, the first condition being met when reference signal received power (RSRP) or reference signal received quality (RSRQ) of the beam is above a threshold, and a sending priority of the MAC layer control signaling being higher than a sending priority of a buffer status report; and
sending, by the apparatus to the terminal device, a response message corresponding to the identifier of the first beam, wherein the response message is associated with a beam serving the terminal device; and
wherein the instructions further comprise instructions for:
receiving a first request from the terminal device, wherein the first request requests an uplink resource; and sending, to the terminal device, second indication information indicating a first uplink resource, wherein the MAC layer control signaling is transmitted on the first uplink resource.

18. The apparatus according to claim 17, wherein the MAC layer control signaling is received when:
   beam failure occurs;
   a first timer expires; or
   a second timer expires and a response to an identifier of a second beam is not received, wherein the second beam is:
      a beam on which a beam failure occurs; or
      a beam meeting the first condition.

19. The apparatus according to claim 17, wherein the sending priority of the MAC layer control signaling is lower than a sending priority of control signaling of an identifier of the terminal device.

20. The apparatus according to claim 17, wherein the instructions further comprise instructions for:
   receiving a connection re-establishment request from the terminal device, wherein the connection re-establishment request is generated by the terminal device when the terminal device cannot receive the identifier of the beam serving the terminal device.

* * * * *